United States Patent
Layfield et al.

(10) Patent No.: US 11,279,255 B2
(45) Date of Patent: Mar. 22, 2022

(54) METHODS AND APPARATUS FOR AN ACTIVE CONVERTOR DOLLY

(71) Applicant: ISABREM LTD., Oakville (CA)

(72) Inventors: Brian Layfield, Oakville (CA); Amir Khajepour, Oakville (CA); Brian Fan, Oakville (CA); John Loewen, Oakville (CA)

(73) Assignee: ISABREM LTD., Oakville (CA)

( * ) Notice: Subject to any disclaimer, the term of this patent is extended or adjusted under 35 U.S.C. 154(b) by 243 days.

(21) Appl. No.: 16/618,709

(22) PCT Filed: May 30, 2018

(86) PCT No.: PCT/CA2018/050633
§ 371 (c)(1),
(2) Date: Dec. 2, 2019

(87) PCT Pub. No.: WO2018/218351
PCT Pub. Date: Dec. 6, 2018

(65) Prior Publication Data
US 2020/0122715 A1    Apr. 23, 2020

Related U.S. Application Data

(63) Continuation of application No. 15/608,098, filed on May 30, 2017, now Pat. No. 10,449,954.

(51) Int. Cl.
*B60W 10/08* (2006.01)
*B62D 53/08* (2006.01)
(Continued)

(52) U.S. Cl.
CPC ............... *B60L 58/12* (2019.02); *B60K 1/04* (2013.01); *B60K 7/0007* (2013.01);
(Continued)

(58) Field of Classification Search
CPC .......... B60L 58/12; B60L 3/0015; B60L 7/18; B60L 15/20; B60L 15/2009;
(Continued)

(56) References Cited

U.S. PATENT DOCUMENTS 3,169,012 A    2/1965  Fagan
3,246,912 A    4/1966  Cunha
(Continued)

FOREIGN PATENT DOCUMENTS

CA    2984156 A1    11/2016
CN    107921884 A    4/2018
(Continued)

OTHER PUBLICATIONS

Office Action issued in U.S. Appl. No. 16/560,528, dated Oct. 29, 2020.
(Continued)

*Primary Examiner* — Jaime Figueroa
(74) *Attorney, Agent, or Firm* — Westman, Champlin & Koehler, P.A.; Z. Peter Sawicki; Amanda M. Prose

(57) ABSTRACT

The disclosure is directed at an apparatus for an active converter dolly for use in a tractor-trailer configuration. In one aspect, the apparatus includes a system to connect a first trailer towed behind a towing vehicle to a second trailer. The apparatus further includes a kinetic energy recovery device for translating the mechanical motions or actions of the dolly into electricity or electrical energy so that this energy can be used to charge a battery or to power other functionality for either the dolly or the tractor-trailer. The active dolly may also operate to assist in shunting the tractor-trailer. The active dolly is operable in a number of modes to increase vehicle performance and efficiency.

20 Claims, 20 Drawing Sheets

(51) Int. Cl.

| | | |
|---|---|---|
| *B62D 59/04* | (2006.01) | |
| *B60L 58/12* | (2019.01) | |
| *B60W 30/02* | (2012.01) | |
| *B60W 10/18* | (2012.01) | |
| *B60W 30/18* | (2012.01) | |
| *B60K 7/00* | (2006.01) | |
| *B62D 1/16* | (2006.01) | |
| *B60L 50/64* | (2019.01) | |
| *B60L 15/20* | (2006.01) | |
| *B60L 7/18* | (2006.01) | |
| *B60L 15/32* | (2006.01) | |
| *B60K 1/04* | (2019.01) | |
| *B60L 58/15* | (2019.01) | |
| *B60L 50/60* | (2019.01) | |
| *B60L 58/26* | (2019.01) | |
| *B60L 58/13* | (2019.01) | |
| *B60L 3/00* | (2019.01) | |
| *B60L 50/16* | (2019.01) | |

(52) U.S. Cl.
CPC .............. *B60L 3/0015* (2013.01); *B60L 7/18* (2013.01); *B60L 15/20* (2013.01); *B60L 15/2009* (2013.01); *B60L 15/2036* (2013.01); *B60L 15/32* (2013.01); *B60L 50/16* (2019.02); *B60L 50/60* (2019.02); *B60L 50/64* (2019.02); *B60L 58/13* (2019.02); *B60L 58/15* (2019.02); *B60L 58/26* (2019.02); *B60W 10/08* (2013.01); *B60W 10/18* (2013.01); *B60W 30/02* (2013.01); *B60W 30/18036* (2013.01); *B62D 1/16* (2013.01); *B62D 53/0864* (2013.01); *B62D 59/04* (2013.01); *B60K 2001/0405* (2013.01); *B60K 2007/0038* (2013.01); *B60K 2007/0092* (2013.01); *B60L 2200/28* (2013.01); *B60L 2200/36* (2013.01); *B60L 2220/46* (2013.01); *B60L 2240/12* (2013.01); *B60L 2240/423* (2013.01); *B60L 2240/44* (2013.01); *B60L 2240/461* (2013.01); *B60L 2240/54* (2013.01); *B60L 2240/80* (2013.01); *B60L 2250/10* (2013.01); *B60W 2510/083* (2013.01); *B60W 2510/244* (2013.01); *B60W 2520/10* (2013.01); *B60W 2540/10* (2013.01); *B60W 2710/083* (2013.01); *B60W 2710/244* (2013.01); *B60W 2720/10* (2013.01); *B60Y 2200/14* (2013.01); *B60Y 2200/147* (2013.01)

(58) Field of Classification Search
CPC ...... B60L 15/2036; B60L 15/32; B60L 50/16; B60L 50/60; B60L 50/64; B60L 58/13; B60L 58/15; B60L 58/26; B60L 2200/28; B60L 2200/36; B60L 2220/46; B60L 2240/12; B60L 2240/423; B60L 2240/44; B60L 2240/461; B60L 2240/54; B60L 2240/80; B60L 2250/10; B60K 1/04; B60K 7/0007; B60K 2001/0405; B60K 2007/0038; B60K 2007/0092; B60W 10/08; B60W 10/18; B60W 30/02; B60W 30/18036; B60W 2510/083; B60W 2510/244; B60W 2520/10; B60W 2540/10; B60W 2710/083; B60W 2710/244; B60W 2720/10; B62D 1/16; B62D 53/0864; B62D 59/04; B60Y 2200/14; B60Y 2200/147; Y02T 10/70; Y02T 10/7072; Y02T 10/72
USPC ...................................................... 701/1, 22
See application file for complete search history.

(56) References Cited

U.S. PATENT DOCUMENTS

| | | | |
|---|---|---|---|
| 3,476,405 A | 11/1969 | Cunha | |
| 3,484,852 A | 12/1969 | Norrie et al. | |
| 3,717,363 A | 2/1973 | Berends | |
| 3,764,164 A | 10/1973 | Lankenau | |
| 3,827,723 A | 8/1974 | Neff et al. | |
| 3,995,876 A | 12/1976 | Ronne | |
| 4,111,273 A | 9/1978 | Blackburn et al. | |
| 4,365,820 A | 12/1982 | Rush | |
| 4,451,058 A | 5/1984 | Curry | |
| 5,017,064 A | 5/1991 | Kirwan et al. | |
| 5,098,115 A | 3/1992 | Haire et al. | |
| 5,246,081 A | 9/1993 | Engle | |
| 5,343,969 A | 9/1994 | Taylor | |
| 5,407,221 A | 4/1995 | Haire et al. | |
| 6,056,309 A | 5/2000 | Brown | |
| 6,481,806 B1 | 11/2002 | Krueger et al. | |
| 6,540,246 B2 | 4/2003 | Andersen et al. | |
| 7,040,425 B2 | 5/2006 | Hammonds | |
| 7,175,134 B2 | 2/2007 | Hsu et al. | |
| 7,258,181 B2 | 8/2007 | Hammonds | |
| 7,451,841 B2 | 11/2008 | Nelson | |
| 7,743,859 B2 * | 6/2010 | Forsyth | B62D 59/04 180/65.1 |
| 7,886,853 B2 * | 2/2011 | Konopa | B62B 5/0026 180/19.1 |
| 7,934,743 B1 | 5/2011 | Wall et al. | |
| 8,235,642 B2 | 8/2012 | Camaly | |
| 8,365,674 B2 | 2/2013 | Banwart | |
| 8,534,694 B2 | 9/2013 | Banwart | |
| 8,794,656 B2 | 8/2014 | West | |
| 8,919,476 B2 | 12/2014 | Holland et al. | |
| 9,126,644 B2 | 9/2015 | Banwart | |
| 9,248,984 B2 | 2/2016 | Andre et al. | |
| 9,643,666 B2 | 5/2017 | Andre et al. | |
| 9,694,712 B2 | 7/2017 | Healy | |
| 9,802,508 B1 | 10/2017 | Healy | |
| 9,937,819 B2 | 4/2018 | Healy | |
| 10,118,505 B2 | 11/2018 | Healy | |
| 2001/0003393 A1 | 6/2001 | Cooper | |
| 2002/0056579 A1 * | 5/2002 | Cooper | B62D 59/04 180/14.2 |
| 2005/0023050 A1 | 2/2005 | Chidlow | |
| 2007/0040353 A1 | 2/2007 | Dallaire | |
| 2007/0193795 A1 * | 8/2007 | Forsyth | B62D 59/04 180/65.285 |
| 2009/0060695 A1 | 3/2009 | Camaly | |
| 2009/0205882 A1 | 8/2009 | Smith et al. | |
| 2010/0025131 A1 | 2/2010 | Gloceri et al. | |
| 2011/0072999 A1 | 3/2011 | Banwart | |
| 2011/0074132 A1 | 3/2011 | Banwart | |
| 2011/0094807 A1 * | 4/2011 | Pruitt | B60K 17/36 180/65.6 |
| 2011/0107938 A1 | 5/2011 | Weidemann et al. | |
| 2012/0080866 A1 | 4/2012 | West | |
| 2012/0152631 A1 | 6/2012 | Oriet | |
| 2013/0079980 A1 | 3/2013 | Vuk et al. | |
| 2014/0015223 A1 | 1/2014 | Banwart | |
| 2014/0277955 A1 | 9/2014 | Eidelson | |
| 2015/0051795 A1 | 2/2015 | Keys, II et al. | |
| 2015/0105992 A1 | 4/2015 | Larsson et al. | |
| 2015/0307142 A1 | 10/2015 | Layfield et al. | |
| 2016/0318406 A1 | 11/2016 | Healy | |
| 2016/0318493 A1 | 11/2016 | Drako | |
| 2017/0129503 A1 | 5/2017 | Meissner | |
| 2017/0253283 A1 | 9/2017 | Eidelson | |
| 2017/0320488 A1 | 11/2017 | Alm et al. | |
| 2017/0106891 A1 | 12/2017 | Wang | |
| 2018/0086227 A1 | 3/2018 | Healy et al. | |
| 2018/0093655 A1 | 4/2018 | Healy et al. | |
| 2018/0154715 A1 | 6/2018 | Brunckhorst et al. | |
| 2018/0170344 A1 | 6/2018 | Laine et al. | |
| 2018/0236994 A1 | 8/2018 | Healy et al. | |

(56) References Cited

U.S. PATENT DOCUMENTS

2018/0297615 A1 10/2018 Banwart
2018/0304944 A1 10/2018 Wright
2020/0276905 A1* 9/2020 Healy ................. B60L 15/2018

FOREIGN PATENT DOCUMENTS

| | | | |
|---|---|---|---|
| EP | 0023513 | B1 | 12/1982 |
| EP | 1451059 | B1 | 2/2007 |
| EP | 1826107 | A2 | 8/2007 |
| EP | 1986883 | B1 | 7/2010 |
| EP | 2544938 | B1 | 8/2015 |
| EP | 3044079 | A1 | 7/2016 |
| EP | 2598392 | B1 | 5/2017 |
| EP | 2483188 | B1 | 12/2017 |
| EP | 2870843 | B1 | 5/2018 |
| EP | 3326438 | A1 | 5/2018 |
| EP | 3330184 | A1 | 6/2018 |
| EP | 3288794 | A4 | 8/2018 |
| EP | 2669124 | B1 | 3/2019 |
| JP | 2010163005 | A | 7/2010 |
| JP | 2018523447 | A | 8/2018 |
| KR | 20180025846 | A | 3/2018 |
| MX | 2017014004 | A | 8/2018 |
| WO | 1980001560 | A1 | 8/1980 |
| WO | 2003047952 | A1 | 6/2003 |
| WO | 2007096509 | A1 | 8/2007 |
| WO | 2008131427 | A1 | 10/2008 |
| WO | 2011041604 | A1 | 4/2011 |
| WO | 2011110996 | A1 | 9/2011 |
| WO | 2012014150 | A1 | 2/2012 |
| WO | 2015042169 | A1 | 3/2015 |
| WO | 2015164914 | A1 | 11/2015 |
| WO | 2018218351 | | 12/2018 |
| WO | 2019042874 | A1 | 3/2019 |

OTHER PUBLICATIONS

U.S. Appl. No. 62/488,491.
International Search Report issued for PCT/CA2018/050633, dated Sep. 5, 2018.
Written Opinion of the International Searching Authority issued for PCT/CA2018/050633, dated Sep. 5, 2018.
Extended European Search Report issued in EP Application Serial No. 18809711.7, dated Feb. 8, 2021.

* cited by examiner

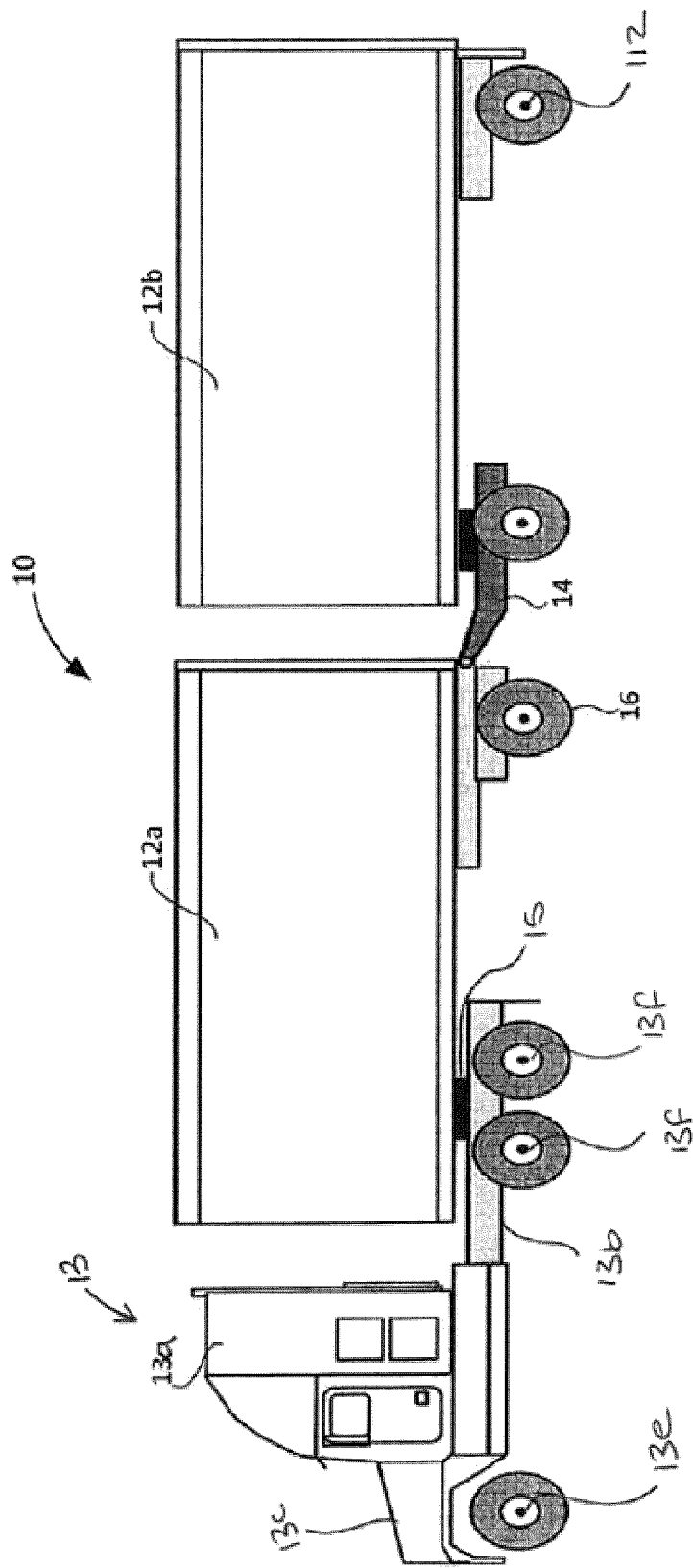

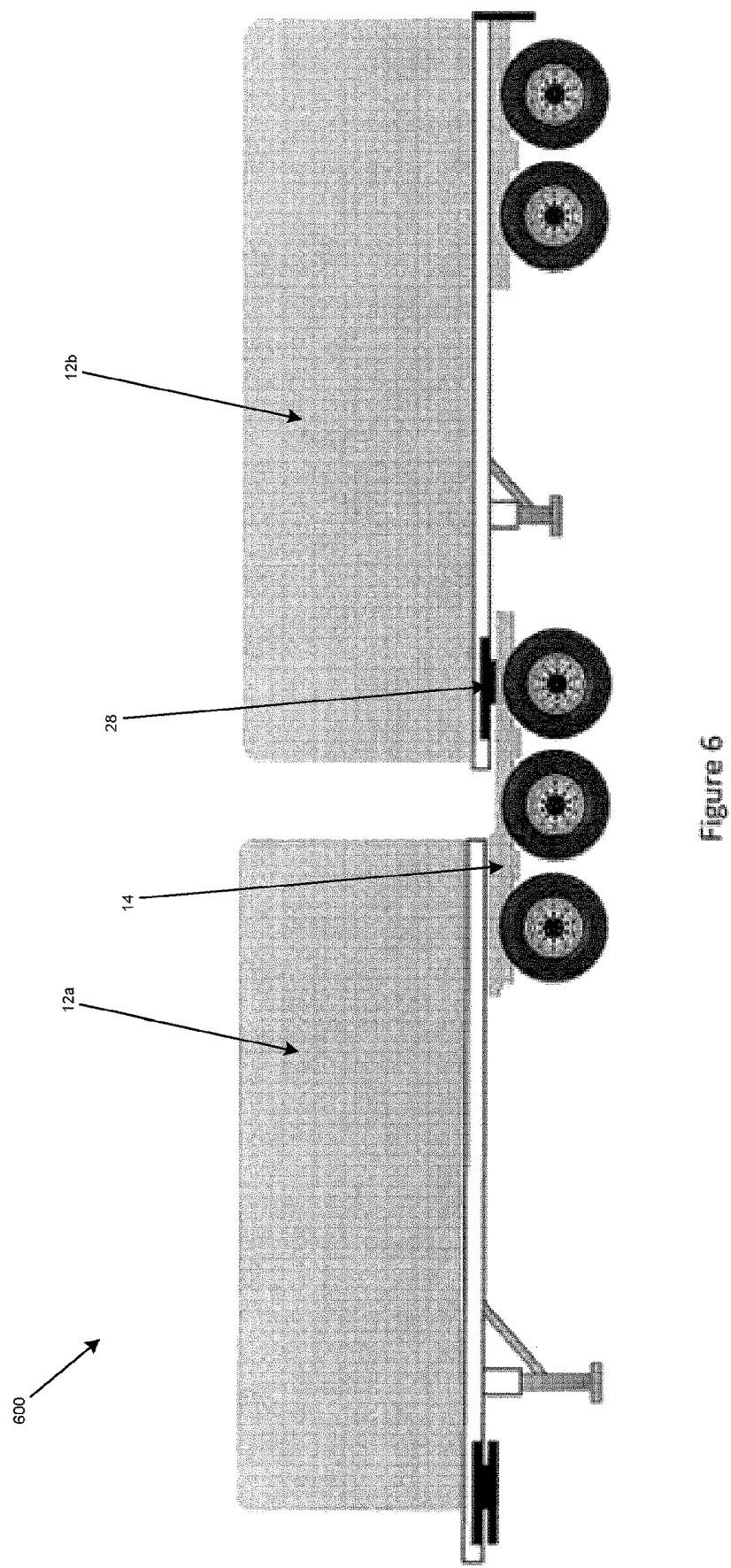

Scenario 1

Scenario 2

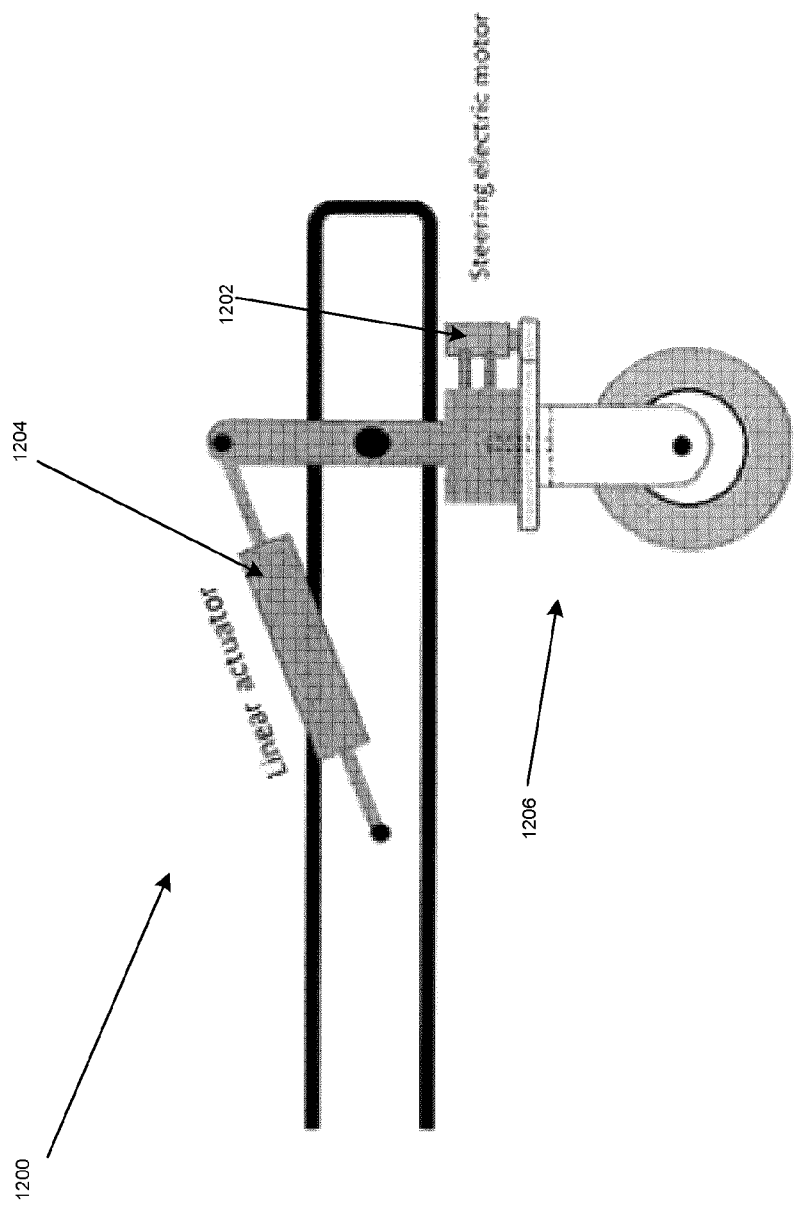

METHODS AND APPARATUS FOR AN ACTIVE CONVERTOR DOLLY

RELATED APPLICATION DATA

The present application is a Section 371 National Stage Application of International Application No. PCT/CA2018/050633, filed May 30, 2018 and published as WO/2018/218351A1, in English, which claims priority to non-provisional U.S. patent application Ser. No. 15/608,098, filed May 30, 2017, now U.S. Pat. No. 10,449,954, issued Oct. 22, 2019, the entire contents of which are incorporated herein by reference.

TECHNICAL FIELD

This disclosure relates generally to the road transportation industry. More specifically, the disclosure is directed at a method and apparatus for an active convertor dolly.

BACKGROUND

Transportation of goods across road networks is typically accomplished by way of a transport truck to which a transport trailer is attached. The truck provides the engine and the trailer provides the cargo space to transport goods within. A recent trend in the transportation of goods by road is the expansion of the size of transport trucks. This expansion is accomplished by both larger trucks and larger trailers. Fewer trips with larger loads can be more efficient in certain circumstances. One way to achieve larger loads is to add a pup trailer, also called a second trailer, behind the main trailer (also called a first trailer). A transport trailer with the pup trailer may be called a transport trailer train.

The typical equipment used to attach a pup trailer to a transport trailer is called a converter dolly. Current convertor dollies are passive and limited in their use and application. They provide a set of wheels to support the front end of the pup (secondary) trailer and a connector assembly for connecting to the rear end of the main (primary) trailer.

SUMMARY

The present disclosure describes a converter dolly apparatus with an electrical kinetic energy recovery device for capturing braking energy. A number of applications are described, including regenerative braking and active electrical motor control of the dolly wheels for improving the fuel economy of transport trucks.

In one aspect of the disclosure, there is provided an apparatus for releasably coupling a second trailer to a first trailer that is releasably coupled to a towing vehicle in a tractor-trailer vehicle configuration. The apparatus comprises a frame, a first trailer connector assembly for releasably coupling the apparatus to the first trailer such that the apparatus translates with the first trailer; a second trailer connector assembly for releasably coupling the apparatus to the second trailer such that the second trailer translates with the apparatus; a pair of wheels; and a kinetic energy recovery device adapted to recover energy from regenerative braking of at least one wheel of the at least one pair of wheels. The first trailer connector assembly, the second trailer connector assembly, the at least one of the wheels, and the kinetic energy recovery device are cooperatively configured such that while the first trailer translates with the towing vehicle, and the releasable coupling of the apparatus to the first trailer and to the second trailer is effected, braking by the towing vehicle is with effect that the kinetic energy recovery device converts kinetic energy generated by rotation of the at least one of the wheels to electrical energy.

In another aspect, the releasable coupling of the apparatus to the first trailer via the first trailer connector assembly includes electrical connection of the kinetic energy recovery device to the first trailer for receiving vehicle data from the towing vehicle.

In another aspect, the releasable coupling of the apparatus to the second trailer via the second trailer connector assembly electrical connection of the kinetic energy recovery device to the second trailer for receiving second-trailer connection data.

(i) In another aspect the kinetic energy recovery device includes a motor-generator operably coupled to the at least one of the wheels, wherein the at least one motor-generator is operable in: a drive mode for applying a motive rotational force to the at least one wheel; and a generator mode for applying a regenerative braking force to the at least one wheel for converting the kinetic energy to the electrical energy, the regenerative braking force effecting deceleration of the at least one wheel; and an energy storing device for storing the electrical energy.

In another aspect, the kinetic energy recovery device includes a controller operably coupled to the motor generator for selectively activating the drive mode or the generator mode.

In another aspect, the at least one of the wheels, the motor-generator, and the controller are cooperatively configured such that while the first trailer is releasably coupled to the towing vehicle and translates with the towing vehicle, and the releasable coupling of the apparatus to the first trailer and to the second trailer is effected, acceleration of the towing vehicle effects activation of the drive mode of the motor-generator.

In another aspect, the at least one of the wheels, the at least one motor-generator, and the controller are cooperatively configured such that while the first trailer is releasably coupled to the towing vehicle and translates with the towing vehicle, and the releasable coupling of the apparatus to the first trailer and to the second trailer is effected, deceleration of the towing vehicle effects activation of the generator mode of the motor-generator.

In another aspect, a first wheel of the at least one pair of wheels is disposed on a first side of a central longitudinal of the frame; and a second wheel of the at least one pair of wheels is disposed on a second, opposite side of the central longitudinal axis of the frame; wherein the first wheel, the second wheel and the frame are cooperatively configured such that the first wheel and the second wheel are disposed for rotation about an axis transverse to, or substantially transverse to, the central longitudinal axis of the frame.

In another aspect, the apparatus further comprises an axle coupled to the frame, wherein each wheel of the pair of wheels is, independently, mounted to the axle; and the motor-generator is operably coupled to the axle such that the motive rotational force is transmitted to both wheels by the axle when the motor-generator operates in the drive mode, and the regenerative braking force is applied to both wheels by the axle when the motor-generator operates in the generator mode.

In another aspect, the apparatus further comprises a first drive shaft coupled to the frame wherein a first wheel of the pair of wheels is rotatably coupled to the first drive shaft such that the rotatable coupling of the first wheel to the frame on the second side of the central longitudinal axis of the apparatus is effected; a second drive shaft coupled to the frame, wherein the second wheel of the pair of wheels is rotatably coupled to the second drive shaft such that the rotatable coupling of the second wheel to the frame on the second side of the central longitudinal axis is effected; a first motor-generator operably coupled to the first drive shaft, wherein the first motor-generator is operable in: a drive mode for applying a motive rotational force to the first wheel; and a generator mode for applying a regenerative braking force to the first wheel for converting the kinetic energy to the electrical energy, the regenerative braking force effecting deceleration of the first wheel; and a second motor-generator operably coupled to the second drive shaft, wherein the second motor-generator is operable in: a drive mode for applying a motive rotational force to the second wheel; and a generator mode for applying a regenerative braking force to the second wheel for converting the kinetic energy to the electrical energy, the regenerative braking force effecting deceleration of the second wheel.

In another aspect, the first motor-generator and the second motor-generator are independently controlled.

In another aspect, the first drive shaft and the second drive shaft are interconnected by a differential.

In another aspect, the first and second wheels, the energy storing device, the first and second motor-generators, and the controller are cooperatively configured such that the first and second motor-generators are powered in the drive mode by the energy storing device.

In another aspect, there is provided an apparatus for releasably coupling a second trailer to a first trailer that is releasably coupled to a towing vehicle in a tractor-trailer vehicle configuration, the apparatus comprising a frame; a first trailer connector assembly for releasably coupling the apparatus to the first trailer such that the apparatus translates with the first trailer; a second trailer connector assembly for releasably coupling the apparatus to the second trailer such that the second trailer translates with the apparatus; a pair of wheels rotatably coupled to the frame; a kinetic energy recovery device operably coupled to at least one of the wheels for converting mechanical energy generated by rotation of the at least one of the wheels to electrical energy; and an energy storing device electrically connected to the kinetic energy recovery device for storing electrical energy generated by the kinetic energy recovery device, wherein the first trailer connector assembly, the second trailer connector assembly, the at least one of the wheels, the kinetic energy recovery device, and the energy-storing device are co-operatively configured such that while the first trailer translates with the towing vehicle and the releasable coupling of the apparatus to the first trailer and to the second trailer is effected, and the towing vehicle is decelerating, the kinetic energy recovery device converts the mechanical energy to electrical energy, which electrical energy is stored on the energy storing device.

In another aspect, the kinetic energy recovery device comprises a motor-generator operably coupled to the at least one wheel and to the energy storing device, wherein the motor-generator is operable in: a drive mode for applying a motive rotational force to the at least one of the wheels; and a generator mode for applying a regenerative braking force to the at least one of the wheels for converting mechanical energy generated by rotation of the at least one of the wheels to electrical energy wherein the generated electrical energy is stored on the energy-storing device; and a controller for selectively activating the drive mode or the generator mode of the motor-generator.

In another aspect, a corresponding motor-generator is operably coupled to each wheel in the pair of wheels.

In another aspect, each one of the wheels, independently, includes a hub; and the corresponding motor-generator for each wheel is disposed within the hub.

In another aspect, the apparatus further comprises a frame and at least one axle coupled to the frame, wherein each wheel of the at least one pair of wheels is mounted to the at least one axle; and the motor-generator is operably coupled to the at least one axle such that operation of the motor-generator in the drive mode applies motive rotational force to both wheels in the at least one pair of wheels, and operation of the motor-generator in the generator mode generates electrical energy in response to a deceleration in rotation of both wheels which electrical energy is stored on the energy-storing device.

In another aspect, the apparatus further comprises a frame; a first drive shaft coupled to the frame, wherein a first wheel is mounted on coupled to the frame and connecting a first wheel of the at least one pair of wheels to the frame on a first side of the central longitudinal axis of the apparatus; and a second drive shaft coupled to the frame and connecting a second wheel of the at least one pair of wheels to the frame, wherein: the motor-generator is a first motor-generator operably coupled to the first drive shaft, such that operation of the motor-generator in the drive mode is with effect that motive rotational force is applied to the first wheel, and operation of the first motor-generator in the generator mode generates electrical energy in response to a deceleration in rotation of the first wheel, which electrical energy is stored by the energy-storing device; the kinetic energy recovery device including a second motor-generator operably coupled to the second drive shaft such that operation of the second motor-generator in the drive mode is with effect that motive rotational force is applied to the second wheel, and operation of the second motor-generator in the generator mode generates electrical energy in response to a deceleration in rotation of the second wheel, which electrical energy is stored by the energy-storing device.

In another aspect, the first motor-generator and the second motor-generator are independently controlled.

In another aspect, the first drive shaft and the second drive shaft are interconnected by a differential.

In another aspect, the frame includes a tongue portion and a wheel supporting portion, wherein: the at least one axle is coupled to the wheel supporting portion; and the first trailer connector assembly is disposed at an end of the tongue portion.

In another aspect, the tongue portion defines an opening; and the controller and the energy storing device are disposed within the opening.

In another aspect, the motor-generator includes a motor-generator reduction gear; and the motor-generator reduction gear is embedded within the at least one axle.

In another aspect, the apparatus further comprises a coaster wheel for supporting the apparatus when the releasable coupling of the first trailer to the apparatus by the first trailer connector assembly is un-coupled, and a steering mechanism, wherein the coaster wheel, the steering mechanism, the at least one pair of wheels, the kinetic energy recovery device, and the energy-storing device are co-operatively configured such that while the releasable coupling of the first trailer to the apparatus is not effected and the releasable coupling of the second trailer to the apparatus is effected, and while electrical energy is stored on the energy storing device, the motor-generator is operable in the drive mode such that the second trailer translates with the apparatus.

In another aspect, the apparatus further comprises a steering device for releasably coupling to the steering mechanism, for steering the apparatus and second trailer, wherein the steering device includes a steering column with a steering wheel.

In another aspect, the first trailer connector assembly includes a hitch assembly.

In another aspect, the second trailer connecting assembly includes a fifth wheel assembly.

In another aspect, the second trailer connector assembly includes a spring suspension system for dampening displacement of the second trailer along an axis perpendicular to, or substantially perpendicular to, a central longitudinal axis of the apparatus.

In another aspect, the energy storing device includes one or more batteries.

In another aspect, the energy storing device includes one or more batteries and one or more capacitors.

In another aspect, the energy-storing device and the controller are disposed intermediate the first trailer connector assembly and the second trailer connector assembly.

In another aspect, the energy-storing device and the controller are disposed in a housing.

In another aspect, the housing includes an aerodynamic leading profile for reducing drag on the apparatus in response to forward displacement of the tractor-trailer vehicle.

In another aspect, the apparatus further comprises a cooling system disposed within the housing for cooling the energy-storing device and the controller.

In another aspect, the cooling system is a liquid-cooled cooling system.

In another aspect, the second trailer connector assembly includes a second trailer support surface and the releasable coupling of the apparatus to the second trailer via the second trailer connector assembly is with effect that the second trailer support surface is disposed underneath the second trailer.

In another aspect, the first trailer connector assembly includes a fifth wheel assembly.

In another aspect, the first trailer connector assembly includes a hitch assembly and the releasable coupling of the apparatus to the first trailer is with effect that the apparatus is disposed behind the first trailer relative to a central longitudinal axis of the tractor-trailer vehicle.

In another aspect, the housing is disposed such that the apparatus has a centre of gravity disposed below a central, midline axis of the apparatus.

In another aspect, the frame is a metal frame.

In another aspect, the frame includes a first material and a second material, wherein the first material is a metal material and the second material is a composite material having a weight that is less than the weight of the metal material such that the frame has a weight that is less than a weight of a frame having only the first, metal material for increasing fuel efficiency of the tractor-trailer vehicle.

In another aspect, an apparatus is provided for releasably coupling a second trailer to a first trailer that is releasably coupled to a towing vehicle in a tractor-trailer vehicle configuration, the apparatus comprising a first trailer connector assembly for releasably coupling the apparatus to the first trailer such that the apparatus translates with the first trailer; a second trailer connector assembly for releasably coupling the apparatus to the second trailer such that the second trailer translates with the apparatus; at least one pair of wheels; a kinetic energy recovery device adapted to recover energy from regenerative braking of the at least one pair of wheels; an energy-storing device electrically connected to the kinetic energy recovery device for storing the electrical energy generated by the regenerative braking; wherein the energy-storing device is disposed intermediate the first trailer connector assembly and the second trailer connecting assembly.

In another aspect, the first trailer connector assembly, the second trailer connector assembly, the at least one pair of wheels, the kinetic energy recovery device and the energy storing device are cooperatively configured such that while the releasable coupling of the apparatus to the first trailer is effected and the releasable coupling of the apparatus to the second trailer is effected, the energy storing device is free of interference from the first trailer and the second trailer.

In another aspect, the kinetic energy recovery device includes at least one motor-generator operably coupled to the at least one wheel, wherein the at least one motor-generator is operable in:

(i) a drive mode for applying a motive rotational force to the at least one wheel; and (ii) a generator mode for applying a regenerative braking force to the at least one wheel for converting the kinetic energy to the electrical energy, the generator mode effecting deceleration of the at least one wheel; and a controller operably coupled to the at least one motor generator for selectively activating the drive mode or the generator mode, wherein the controller is disposed intermediate the first trailer connector assembly and the second trailer connecting assembly proximal to the energy storing device such that while the releasable coupling of the apparatus to the first trailer is effected and the releasable coupling of the apparatus to the second trailer is effected, the controller is free of interference from the second trailer.

In another aspect, the energy storing device and the controller are disposed in a housing.

In another aspect, the apparatus further comprises a frame having a tongue portion and a wheel supporting portion, wherein: the first trailer connector assembly is disposed at a first end of the tongue portion and the wheel supporting portion extends from a second end of the tongue portion; the at least one pair of wheels is mounted to the wheel supporting portion such that a first wheel is disposed on a first side of a central longitudinal axis of the frame and configured for rotation about an axis transverse to, or substantially transverse to, the central longitudinal axis of the frame, and a second wheel is disposed on a second, opposite side of the central longitudinal axis and configured for rotation about and an axis transverse to, or substantially transverse to, the central longitudinal axis of the frame; the second trailer connecter assembly is supported by the wheel supporting portion; and the tongue portion defines an opening, the housing disposed within the opening and secured to the frame.

In another aspect, an apparatus is provided for releasably coupling a second trailer to a first trailer that is releasably coupled to a towing vehicle in a tractor-trailer vehicle configuration, the apparatus comprising a frame; a first trailer connector assembly disposed at a first end of the frame for releasably coupling the apparatus to the first trailer such that the apparatus translates with the first trailer; a second trailer connector assembly for releasably coupling the apparatus to the second trailer such that the second trailer translates with the apparatus; at least one pair of wheels; and a kinetic energy recovery device adapted to recover energy from regenerative braking of at least one wheel of the at least one pair of wheels, comprising at least one motor-generator operably coupled to the at least one wheel, wherein the at least one motor-generator is operable in:

(i) a drive mode for applying motive rotational force to the at least one wheel; and (ii) a generator mode for converting the kinetic energy to the electrical energy, the generator mode effecting deceleration of the at least one wheel;

an energy storing device for storing the electrical energy; and a controller operably coupled to the at least one motor generator for selectively activating the drive mode or the generator mode, wherein the first trailer connector assembly, the second trailer connector assembly, the at least one wheel, and the kinetic energy recovery device are cooperatively configured such that while the first trailer translates with the towing vehicle, and the releasable coupling of the apparatus to the first trailer and to the second trailer is effected, braking by the towing vehicle is with effect that the kinetic energy recovery device converts kinetic energy generated by rotation of the at least one wheel to electrical energy.

In another aspect, the apparatus further comprises a first drive shaft coupled to the frame and connecting a first wheel of the at least one pair of wheels to the frame on a first side of the central longitudinal axis of the apparatus; and a second drive shaft coupled to the frame and connecting a second wheel of the at least one pair of wheels to the frame on a second, opposite side of the central longitudinal axis of the apparatus, wherein a first motor-generator is operably coupled to the first drive shaft, such that operation of the first motor-generator in the drive mode is with effect that motive rotational force is applied to the first wheel, and operation of the first motor-generator in the generator mode generates electrical energy in response to a deceleration of the first wheel, which electrical energy is stored by the energy-storing device; and a second motor-generator, controlled independently from the first motor-generator, is operably coupled to the second drive shaft such that operation of the second motor-generator in the drive mode is with effect that motive rotational force is applied to the second wheel, and operation of the second motor-generator in the generator mode generates electrical energy in response to a deceleration of the second wheel, which electrical energy is stored by the energy-storing device.

In another aspect, the apparatus further comprises a first wheel speed sensor operably coupled to the first wheel or the first drive shaft for providing first wheel speed data comprising a first wheel speed to the controller; and a second wheel speed sensor operably coupled to the second wheel or the second drive shaft for providing second wheel speed data comprising a second wheel speed to the controller, wherein the controller is configured to detect a low-traction condition based on at least the first wheel speed data and the second wheel speed data; and adjust motive rotational force applied to at least one of the first wheel and the second wheel when a low-traction condition is detected.

In another aspect, the apparatus further comprises an axle locking mechanism coupled to lock the rotation of the first drive shaft to the rotation of the second drive shaft when the axle locking mechanism is activated, wherein adjusting motive rotational force comprises activating the axle locking mechanism.

In another aspect, the first motor-generator and the second motor-generator are controlled independently.

In another aspect, detecting a low-traction condition comprises detecting that the difference between the first wheel speed and the second wheel speed is above a predetermined threshold.

In another aspect, adjusting motive rotational force comprises increasing the motive rotational force applied by the first motor-generator to the first wheel if the first wheel speed is lower than the second wheel speed and increasing the motive rotational force applied by the second motor-generator to the second wheel if the second wheel speed is lower than the first wheel speed.

In another aspect, adjusting motive rotational force comprises reducing the motive rotational force applied by the first motor-generator to the first wheel if the first wheel speed is higher than the second wheel speed and reducing the motive rotational force applied by the second motor-generator to the second wheel if the second wheel speed is higher than the first wheel speed.

In another aspect, the apparatus further comprises a gyroscope sensor attached to the frame for providing angular acceleration data to the controller and an accelerometer for providing linear acceleration data to the controller, wherein the low-traction condition is detected based at least in part on the angular acceleration data.

In another aspect, detecting the low-traction condition comprises detecting that the apparatus is moving forward based on the linear acceleration data and detecting an increase in the angular acceleration of the apparatus about a vertical axis of the apparatus based on the angular acceleration data.

In another aspect, adjusting motive rotational force comprises adjusting at least one of the motive rotational force applied by the first motor-generator and the motive rotational force applied by the second motor-generator to create angular acceleration in the opposite direction of the detected increase in angular acceleration.

In another aspect, the controller is further configured to: detect that the low-traction condition is no longer present; and resume a baseline operating mode.

In another aspect, the apparatus further comprises a communication interface for providing vehicle data from the towing vehicle to the controller.

In another aspect, the vehicle data comprises controller area network bus data from the towing vehicle.

In another aspect, the communication interface comprises a wireless communication interface.

In another aspect, the wireless communication interface is configured to communicate with an on-board diagnostics port of the tractor.

In another aspect, the vehicle data comprises: vehicle braking data indicating the degree of braking applied by the driver of the tractor; and vehicle speed data indicating the speed of the tractor; and the controller is further configured to activate an electric-vehicle mode, comprising the drive mode of the motor-generator, in response to detecting: that a state of charge of the energy storing device is above a charge threshold; that the speed of the tractor is below a speed threshold; and that the degree of braking applied by the driver is below a braking threshold.

In another aspect, the charge threshold is between 10% and 40% of a full charge level of the energy storing device.

In another aspect, the speed threshold is between 5 kilometers/hour and 40 kilometers/hour.

In another aspect, the braking threshold is between 10% and 50% of a full brake activation level.

In another aspect, the amount of motive rotational force applied by the at least one motor-generator in electric-vehicle mode is based on the degree of braking applied by the driver.

In another aspect, the controller is further configured to deactivate electric-vehicle mode in response to detecting:

that a state of charge of the energy storing device is below the charge threshold; that the speed of the tractor is above the speed threshold; or that the degree of braking applied by the driver is above the braking threshold.

In another aspect, the towing vehicle, the first trailer, and the second trailer collectively include a plurality of electrical systems; the releasable coupling of the apparatus to the first trailer via the first trailer connector assembly includes electrical connection of the kinetic energy recovery device to the first trailer for providing power from the energy storing device to one or more of the first trailer and the towing vehicle; the vehicle data comprises vehicle transmission data indicating the state of the transmission of the towing vehicle; and the controller is further configured to activate an anti-idling mode in response to detecting a parked state of the towing vehicle based on at least the vehicle transmission data, the anti-idling mode comprising using the energy storing device to power one or more electrical systems selected from the plurality of electrical systems.

In another aspect, the towing vehicle has a manual transmission; the vehicle data further comprises parking brake data indicating the state of a parking brake of the towing vehicle; and the parked state is detected based on at least vehicle transmission data indicating that the transmission is in a manual state and parking brake data indicating that the parking brake is in an engaged state.

In another aspect, the plurality of electrical systems comprises a climate-control system of one or more of the second trailer, the first trailer, and the towing vehicle; and the anti-idling mode comprises using the energy storing device to power the climate-control system.

In another aspect, activating the anti-idling mode further comprises sending an engine deactivation control signal to the towing vehicle.

In another aspect, the engine deactivation control signal is sent via the electrical connection.

In another aspect, the communication interface is further configured to send data from the controller to the towing vehicle and the engine deactivation control signal is sent via the communication interface.

In another aspect, the releasable coupling of the apparatus to the first trailer via the first trailer connector assembly includes electrical connection of the kinetic energy recovery device to the first trailer for providing power from the energy storing device to one or more of the first trailer and the towing vehicle; and the controller is configured to cause the kinetic energy recovery device to transmit stored energy from the energy storing device via the electrical connection to jumpstart a towing vehicle battery.

In another aspect, the controller further is configured to detect a backup jack-knifing condition based on at least the first wheel speed data and the second wheel speed data; and adjust the speed of at least one of the first wheel and the second wheel when a backup jack-knifing condition is detected.

In another aspect, detecting a backup jack-knifing condition comprises detecting that: the first wheel and the second wheel are both rotating backward; and the difference between the first wheel speed and the second wheel speed is above a predetermined threshold.

In another aspect, adjusting the speed of at least one of the first wheel and the second wheel comprises increasing the motive rotational force applied by the first motor-generator to the first wheel if the first wheel speed is lower than the second wheel speed and increasing the motive rotational force applied by the second motor-generator to the second wheel if the second wheel speed is lower than the first wheel speed.

In another aspect, adjusting the speed of at least one of the first wheel and the second wheel comprises using the kinetic energy recovery device to apply regenerative braking: to the first wheel if the first wheel speed is higher than the second wheel speed; and to the second wheel if the second wheel speed is higher than the first wheel speed.

In another aspect, the apparatus further comprises a gyroscope sensor attached to the frame for providing angular acceleration data to the controller; and an accelerometer for providing linear acceleration data to the controller, wherein the backup jack-knifing condition is detected based at least in part on the angular acceleration data.

In another aspect, detecting the backup jack-knifing condition comprises: detecting that the apparatus is moving backward based on the linear acceleration data; and detecting an increase in the angular acceleration of the apparatus about a vertical axis of the apparatus based on the angular acceleration data.

In accordance with other aspects of the present disclosure, there are provided methods of controlling a dolly apparatus as described above and herein.

In a further aspect, there is provided a method for providing stability assistance to a converter dolly towing a second trailer behind a first trailer, the first trailer being towed by a towing vehicle, the converter dolly comprising at least one axle having at least a first wheel on a left side of the converter dolly and a second wheel on the right side of the converter dolly, the first wheel being operably coupled to a first motor-generator, the left second being operably coupled to a second motor-generator, such that the first motor-generator and second motor-generator are each operable in a drive mode for applying a motive rotational force to the first or second wheel respectively, and a generator mode for applying a regenerative braking force to the first or second wheel respectively for converting the kinetic energy to the electrical energy, the regenerative braking force effecting deceleration of the first or second wheel respectively, the method comprising: detecting a low-traction condition based on at least a rotational speed of the first wheel and a rotational speed of the second wheel; and adjusting one or more of the motive rotational force and the regenerative braking force applied to at least one of the first wheel and the second wheel when a low-traction condition is detected.

In a further aspect, there is provided a method for imparting forward motion a tractor-trailer vehicle using a converter dolly towing a second trailer of the tractor-trailer vehicle behind a first trailer of the tractor-trailer vehicle, the first trailer being towed by a towing vehicle, the converter dolly comprising at least one axle having at least a first wheel on a left side of the converter dolly and a second wheel on the right side of the converter dolly, the first wheel and second wheel being operably coupled to at least one motor-generator, such that the at least one motor-generator is operable in a drive mode for applying a motive rotational force to at least one of the first wheel and second wheel, and an energy storing device used to provide electrical power to the motor-generator in drive mode, the method comprising receiving at the converter dolly vehicle data from the towing vehicle, the vehicle data comprising braking data indicating the degree of braking applied by the driver of the towing vehicle; and vehicle speed data indicating the speed of the towing vehicle, and activating the drive mode of the at least one motor-generator in response to detecting that a state of charge of the energy storing device is above a charge threshold, that the speed of the towing vehicle is below a speed threshold, and that the degree of braking applied by the driver of the towing vehicle is below a braking threshold.

In a further aspect, there is provided a method for powering one or more electrical systems of a tractor-trailer vehicle using a converter dolly towing a second trailer of the tractor-trailer vehicle behind a first trailer of the tractor-trailer vehicle, the first trailer being towed by a towing vehicle, the converter dolly comprising an energy storing device, the method comprising: receiving vehicle data at the converter dolly comprising vehicle transmission data indicating the state of the transmission of the towing vehicle; and activating an anti-idling mode of the converter dolly in response to detecting a parked state of the towing vehicle based on at least the vehicle transmission data, wherein the anti-idling mode comprises using the energy storing device to power at least one of the one or more electrical systems.

In a further aspect, there is provided a method for providing backup assistance to a converter dolly towing a second trailer behind a first trailer, the first trailer being towed by a towing vehicle, the converter dolly comprising at least one axle having at least a first wheel on a left side of the converter dolly and a second wheel on the right side of the converter dolly, the first wheel being operably coupled to a first motor-generator, the left second being operably coupled to a second motor-generator, such that the first motor-generator and second motor-generator are each operable in: a drive mode for applying a motive rotational force to the first or second wheel respectively; and a generator mode for applying a regenerative braking force to the first or second wheel respectively for converting the kinetic energy to the electrical energy, the regenerative braking force effecting deceleration of the first or second wheel respectively, the method comprising: detecting a backup jack-knifing condition based on at least a rotational speed of the first wheel and a rotational speed of the second wheel; and adjusting one or more of the motive rotational force and the regenerative braking force applied to at least one of the first wheel and the second wheel when a backup jack-knifing condition is detected.

In a further aspect, there is provided a method for imparting forward motion a tractor-trailer vehicle using a converter dolly towing a second trailer of the tractor-trailer vehicle behind a first trailer of the tractor-trailer vehicle, the first trailer being towed by a towing vehicle, the converter dolly comprising: at least one axle having at least a first wheel on a left side of the converter dolly and a second wheel on the right side of the converter dolly, the first wheel and second wheel being operably coupled to at least one motor-generator, such that the at least one motor-generator is operable in: a drive mode for applying a motive rotational force to at least one of the first wheel and second wheel; and a generator mode for converting kinetic energy to electrical energy, the generator mode effecting deceleration of at least one of the first wheel and second wheel, the method comprising: activating the drive mode of the at least one motor-generator in response to detecting acceleration of the first trailer relative to the second trailer; and activating the generator mode of the at least one motor-generator in response to detecting deceleration of the first trailer relative to the second trailer.

In a further aspect, there is provided a method of operating a dolly apparatus for releasably coupling a second trailer to a first trailer that is releasably coupled to a towing vehicle in a tractor-trailer vehicle configuration, the dolly apparatus having at least one pair of wheels comprising a first wheel and a second wheel, the method comprising: measuring a speed of the first wheel; measuring a speed of the second wheel; detecting a low-traction condition based on at least the speed of the first wheel data and the speed of the second wheel; and adjusting motive rotational force applied to at least one of the first wheel and the second wheel when a low-traction condition is detected.

In a further aspect, there is provided a method of operating a dolly apparatus for releasably coupling a second trailer to a first trailer that is releasably coupled to a towing vehicle in a tractor-trailer vehicle configuration, the dolly apparatus having at least one pair of wheels comprising a first wheel and a second wheel, the dolly apparatus having a kinetic energy recovery device that stores energy in an energy storing device during braking of the towing vehicle, the method comprising: determining a degree of braking applied by the towing vehicle; determining a speed of the towing vehicle; determining a state of charge of an energy storing device of the apparatus; activate an electric-vehicle mode of the apparatus in response to determining that a state of charge of the energy storing device is above a charge threshold, he speed of the towing vehicle is below a speed threshold, the degree of braking applied by the driver is below a braking threshold, wherein the electric-vehicle mode comprises driving the dolly apparatus using the energy storing device.

In a further aspect, there is provided a method of operating a dolly apparatus for releasably coupling a second trailer to a first trailer that is releasably coupled to a towing vehicle in a tractor-trailer vehicle configuration, the dolly apparatus having at least one pair of wheels comprising a first wheel and a second wheel, the dolly apparatus having a kinetic energy recovery device that stores energy in an energy storing device during braking of the towing vehicle, the method comprising: determining when the towing vehicle has been stopped for at least a predetermined amount of time or when the towing vehicle is a parked state; activating an anti-idling mode in response to determining that the towing vehicle has been stopped for at least the predetermined amount of time, that the towing vehicle is a parked state or both, wherein the anti-idling mode comprises powering one or more electrical systems of the towing vehicle, the first trailer and/or the second trailer using the energy storing device.

In a further aspect, there is provided a method of operating a dolly apparatus for releasably coupling a second trailer to a first trailer that is releasably coupled to a towing vehicle in a tractor-trailer vehicle configuration, the dolly apparatus having at least one pair of wheels comprising a first wheel and a second wheel, the dolly apparatus having a kinetic energy recovery device that stores energy in an energy storing device during braking of the towing vehicle, the method comprising: detecting a jumpstart condition of the dolly apparatus; and operating the dolly apparatus to transmit stored energy from the energy storing device via an electrical connection a towing vehicle battery to jumpstart towing vehicle in response to detecting a jumpstart condition of the dolly apparatus.

In a further aspect, there is provided a method of operating a dolly apparatus for releasably coupling a second trailer to a first trailer that is releasably coupled to a towing vehicle in a tractor-trailer vehicle configuration, the dolly apparatus having at least one pair of wheels comprising a first wheel and a second wheel, the method comprising: measuring a speed of the first wheel; measuring a speed of the second wheel; detecting a backup jack-knifing condition based on at least the speed of the first wheel data and the speed of the second wheel; and detect a based on at least the first wheel speed data and the second wheel speed data; and adjust the speed of at least one of the first wheel and the second wheel when a backup jack-knifing condition is detected.

In a further aspect, there is provided a method of operating a dolly apparatus for releasably coupling a second trailer to a first trailer that is releasably coupled to a towing vehicle in a tractor-trailer vehicle configuration, the dolly apparatus having at least one pair of wheels comprising a first wheel and a second wheel, the method comprising: measuring acceleration or deceleration of the first trailer relative to the second trailer; operating at least one motor-generator of the dolly apparatus in a drive mode in response to acceleration of the first trailer relative to the second trailer; and operating the at least one motor-generator of the dolly apparatus in response to deceleration of the first trailer relative to the second trailer.

In accordance with further aspects of the present disclosure, there is provided a non-transitory machine readable medium having tangibly stored thereon executable instructions for execution by a processor of a controller of a dolly apparatus. The executable instructions, when executed by the controller, cause the controller to perform the methods described above and herein, and cause the dolly apparatus to behave as described above and herein.

BRIEF DESCRIPTION OF THE DRAWINGS

Reference will now be made by way of example only to preferred embodiments of the disclosure by reference to the following drawings in which:

FIG. 1 is a side view of a tractor-trailer including an active converter dolly;

FIG. 6 is a schematic diagram of another embodiment of an active converter dolly for use with a tractor-trailer;

FIG. 12 is a schematic diagram of a steering mechanism for use with an active converter dolly apparatus;

DETAILED DESCRIPTION OF EXAMPLE EMBODIMENTS

Figure 2A:
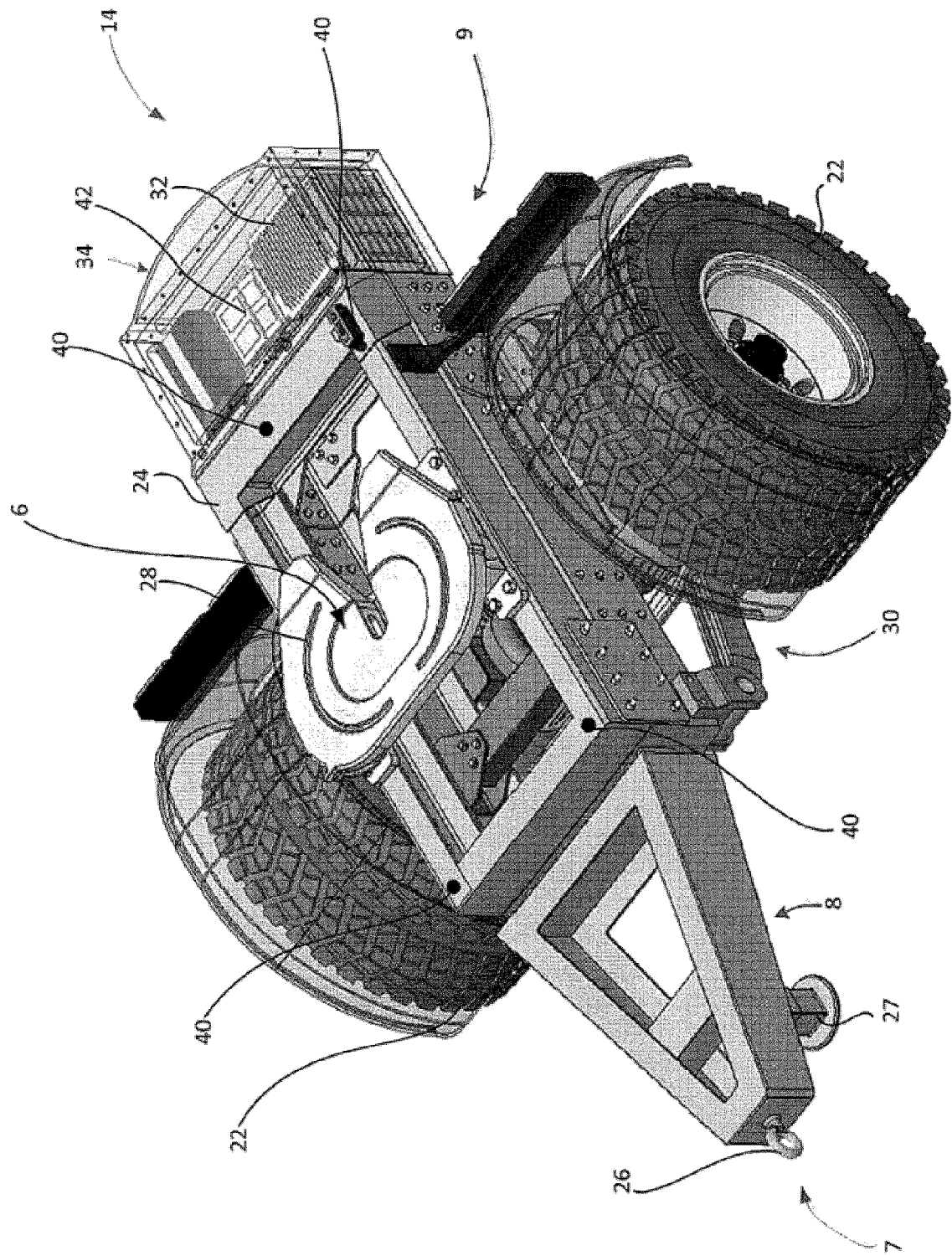
FIG. 2a is a perspective view of another embodiment of an active converter dolly.

The disclosure is directed at an active converter dolly apparatus for use in a tractor-trailer configuration. More specifically, with reference now to FIGS. 1-20, there is disclosed an apparatus for releasably coupling a second trailer to a first trailer that is releasably coupled to a tractor or towing vehicle in a tractor-trailer vehicle configuration.

In one embodiment, the apparatus includes a system to connect a towing vehicle to a trailer. The apparatus further includes a kinetic energy recovery device for translating the mechanical motions or actions of the dolly into electricity or electrical energy so that this energy can be used to charge an energy storing device such as a battery or to power other functionality for either the dolly or the tractor-trailer.

With reference to FIG. 1, a schematic diagram of a tractor-trailer vehicle configuration incorporating an example embodiment of an active converter dolly apparatus 14 according to the present disclosure is shown.

The tractor-trailer 10 includes a towing vehicle 13, such as a tractor, cab or truck that pulls a pair of trailers 12 (seen as a primary or first trailer 12a and a secondary or second trailer 12b) that are connected to each other via an active convertor dolly apparatus 14. The active convertor dolly apparatus 14 connects the two trailers 12a and 12b together such that they move with respect to each other when the towing vehicle 13 is in motion. While only a pair of trailers 12 is shown, it will be understood that more than one active converter dolly apparatus 14 may be used in combination with additional trailers in instances when a tractor-trailer configuration having more than two trailers is desired. Accordingly, the active converter dolly apparatus 14 disclosed in the subject application is not intended to be limited to use in a tractor-trailer configuration having only primary and secondary trailers.

As shown in FIG. 1, the primary and secondary trailers 12a, 12b are connected to each other via the active convertor dolly apparatus 14. The active convertor dolly apparatus 14 connects the two trailers 12a and 12b such that they move together with the towing vehicle 13 when the towing vehicle 13 is in motion. In some embodiments, for example, the apparatus 14 releasably couples the second trailer 12b to the first trailer 12a, which is releasably coupled to the towing vehicle 13, such that while the first trailer 12a is releasably coupled to the towing vehicle 13 and the towing vehicle 13 is in motion, the apparatus 14 translates with the first trailer 12a and the second trailer 12b translates with the apparatus 14, the apparatus 14, the first trailer 12a, the second trailer 12b and the towing vehicle 13 therefore together forming the tractor-trailer vehicle configuration.

The towing vehicle 13 (sometimes referred to as a prime mover or traction unit) is generally in the form of a heavy-duty towing vehicle having a heavy-duty towing engine that provides motive power for hauling a load. In the subject example embodiment, the towing vehicle 13 has a cab portion 13a and a flatbed portion 13b that extends rearwardly from the cab portion 13a. The cab portion 13a includes an engine compartment 13c and a driver compartment 13d. A front axle 13e is located under the engine compartment 13c and one or more rear axles 13f are located under the flatbed portion 13b of the towing vehicle 13. While in the subject example embodiment the towing vehicle 13 is shown as having only three axles, it will be understood that the actual number axles can vary depending on the actual size of the towing vehicle 13 and the various sizes/types of loads that the towing vehicle 13 is configured for or intended to pull.

In some embodiments, for example, one or more axles on the towing vehicle 13 may be steering axles and one or more axles are driven axles for transmitting motive power from the engine to the wheels 16. Un-driven axles are those that do not receive motive power from the engine but that rotate as a result of the motion induced by the driven axles. In some embodiments, for example, the steering axle(s) may also be driven. In some embodiments, for example, an un-driven rear axle can be raised such that the wheels mounted thereon are no longer in contact with the ground or roadway in instances when the towing vehicle 13 is lightly loaded or is not coupled to a trailer so as to save wear on the tires/wheels and/or increase traction on the wheels/tires associated with the driven axle(s).

Trailers 12a, 12b typically have no front axle and one or more un-driven rear axles 112. In some embodiments, for example, the rear axles 112 of trailers 12a, 12b are fixed axles and, in some example embodiments, the rear axles 112 may be part of a slider unit (not shown) that is mounted underneath the trailer 12a, 12b which allows the rear axles 112 to be moved forward or backward, in accordance with principles known in the art, depending on the load being carried by the trailer 12.

In the subject example embodiment, the primary trailer or first trailer 12a is supported by the flatbed portion 13b of the towing vehicle 13. In some embodiments, for example, in order to couple the first trailer 12a to the towing vehicle 13, the flatbed portion 13b is provided with a coupling plate 15, commonly referred to as a fifth wheel coupling, configured for receiving and coupling with a corresponding locking pin, or kingpin, (not shown) that extends from underneath the first trailer 12b which is received within a corresponding slot formed in the coupling plate 15, the first trailer 12b resting and pivoting on the coupling plate 15 about the locking pin. While a fifth wheel coupling has been described in connection with the coupling of the first trailer to the towing vehicle 13 it will be understood that various other couplings may be used provided the coupling between the towing vehicle 13 and the first trailer 12a is such that the first trailer translates with the towing vehicle 13 when the towing vehicle 13 is in motion and can pivot relative to the towing vehicle 13 for maneuverability. The coupling of the first trailer 12a to the towing vehicle 13 also includes the coupling of at least brake lines to transmit braking forces to the wheels 16 of the trailer 12a when the driver applies the tractor brakes. The coupling of the first trailer 12a to the towing vehicle 13 also includes the coupling of electrical cable to ensure an electrical connection between the tractor and the first trailer 12a for proper operation of tail lights and any other required auxiliary devices or systems associated with the first trailer 12a.

In the subject example embodiment, the second trailer 12b is coupled to the first trailer 12a by way of the active converter dolly or apparatus 14. Accordingly, the active converter dolly or apparatus 14 includes at least one pair of wheels 22 that act as the front axle of the second trailer 12b and also includes a first trailer connector assembly 7 for releasably coupling the apparatus 14 to the first trailer 12a such that the apparatus 14 translates with the first trailer 12a. A second trailer connector assembly 6 is provided for releasably coupling the apparatus 14 to the second trailer 12b such that the second trailer 12b translates with the apparatus 14 with both the first trailer 12a and the second trailer 12b being towed by the towing vehicle 13. The coupling of the second trailer 12b within the tractor-trailer vehicle configuration also includes the coupling of brake lines and electrical cables to ensure proper operation of the tractor trailer vehicle 10. As set out above, the apparatus 14 is intended to act as the front axle of the secondary trailer 12b with only a portion of the apparatus 14 extending underneath the secondary trailer 12b such that there is a partial overlap of the trailer 12b with respect to the apparatus 14. In some embodiments, for example, the second trailer connector assembly 6 includes a second trailer support surface and the releasable coupling of the apparatus 14 to the second trailer via the second trailer connector assembly 6 is with effect that the second trailer support surface is disposed underneath the second trailer 12 b. In some embodiments, for example, the overlap between the secondary trailer 12b and the apparatus 14 is less than 75% of the length of the secondary trailer 12b. In some embodiments, for example, the overlap between the secondary trailer 12b and the apparatus 14 is less than 50% of the length of the secondary trailer 12b. In some embodiments, for example, the overlap between the secondary trailer 12b and the apparatus 14 is less than 25% of the length of the secondary trailer 12b. Different embodiments of the apparatus 14 may have different maximum lengths when measured along an axis of the apparatus 14 that is parallel to its central longitudinal axis. In some embodiments, the maximum length is 15 feet. In other embodiments, the maximum length is 12.5 feet. In other embodiments, the maximum length is 10 feet.

In some embodiments, for example, the active converter dolly or apparatus 14 defines a footprint having an area that is less than 50% of an area defined by an undersurface of the secondary trailer 12b. In some embodiments, for example, the apparatus defines a footprint having an area less than or equal to 50 ft$^2$.

In the subject example embodiment, the active converter dolly apparatus 14 includes a kinetic energy recovery device 30 that is adapted to recover energy from regenerative braking of at least one wheel of the at least one pair of wheels 22 wherein the first trailer connector assembly 7, the second trailer connector assembly 6, the at least one wheel 22, and the kinetic energy recovery device 30 are cooperatively configured such that while the first trailer 12a translates with the towing vehicle 13, and the releasable coupling of the apparatus 14 to the first trailer 12a and to the second trailer 12b is effected, braking by the towing vehicle 13 is with effect that the kinetic energy recovery device 30 converts kinetic energy generated by rotation of the at least one wheel 22 to electrical energy. In some embodiments, for example, the first trailer connector assembly 7, the second trailer connector assembly 6, the at least one wheel 22, the kinetic energy recovery device 30 and the energy storing device 32 are cooperatively configured such that while the first trailer 12a translates with the towing vehicle 13, and the releasable coupling of the apparatus 14 to the first trailer 12a and to the second trailer 12b is effected, and the towing vehicle 13 is decelerating, the kinetic energy recovery device 30 converts the mechanical energy to electrical energy, which electrical energy is stored on the energy storing device 32.

Regenerative braking, in general, is an energy recovery mechanism when the mechanical or kinetic energy generated by the rotation of the wheels is recovered or converted into another usable form by applying a regenerative braking force to the wheels, the regenerative braking force effectively slowing down or causing a deceleration in the rotation of the wheels. More specifically, in systems incorporating regenerative braking, an electric motor is used as an electric generator by operating the electric motor in reverse and is therefore often referred to as a motor-generator. The kinetic energy generated by the rotating wheels is transformed into electrical energy by the generator, which electric energy is subsequently stored by an energy storing device 32 such as, for example, a battery. In some embodiments, for example, the energy storing device 32 includes one or more batteries and one or more capacitors. The energy stored on the energy storing device can then be used for other applications.

In some embodiments, for example, the kinetic energy recovery device 30 is a charge-generating system for translating mechanical motion experienced by the apparatus 14 into an electric charge which allows the apparatus 14 to be used for other applications, as set out in more detail below. In some embodiments, the electric charge can be used to charge a battery or other energy storing device. In some embodiments, the electric charge may be used to power auxiliary devices like refrigeration, an HVAC unit, or other climate control system mounted to the tractor-trailer 10 as part of, either, the towing vehicle 13, first trailer 12a, or second trailer 12b. In some embodiments, the charged battery can be used to jumpstart a dead truck battery or to supply power to accessories when the engine of the towing vehicle 13 is off. In some embodiments, the charged battery can be used to provide motive rotational force to the dolly's wheel through one or more motor-generators.

In some embodiments, the controller is configured to detect a jumpstart condition of the dolly apparatus 14. The jumpstart condition may be, for example, a condition/state of an interrupt, a presence of an electrical connection between the energy storing device 32 and a towing vehicle battery, an operating condition of the controller (e.g., software setting or the like), or a combination thereof. The dolly apparatus 14 may be operated to transmit stored energy from the energy storing device via an electrical connection a towing vehicle battery to jumpstart towing vehicle in response to detecting a jumpstart condition of the dolly apparatus 14.

In some embodiments, for example, the active convertor dolly apparatus 14 may be configured to generate charge from other wheels and axles within the tractor-trailer vehicle 10, such as in a series or parallel implementation, to charge the energy-storing device or battery.

In some embodiments, for example, the active convertor dolly apparatus 14 is a through-the-road (TTR) hybrid vehicle as the apparatus 14 is configured to operate independently from the other axles of the trailers 12 of the tractor-trailer vehicle 10 as will be described in further detail below.

Turning to FIG. 2a, a perspective view of one example embodiment of an active convertor dolly apparatus 14 is shown.

In this example embodiment, the active converter dolly apparatus 14 includes a frame 24 including a wheel supporting portion, or second end, 9 along with a tongue portion, or first end 8. The frame 24 can be manufactured from different materials such as, but not limited to, high strength steel, carbon fibre, aluminum, or other materials. As will be understood, the apparatus 14 does not have to be made entirely from one material and may be a combination of at least two different materials. As will be discussed in more detail below, the lightweight nature of the composite materials may also provide a benefit or advantage in terms of fuel savings. In some embodiments, for example, the frame 24 is made from lightweight composites in combination with metal components when required for strength or reinforcement purposes. Accordingly, in some embodiments, for example the frame 24 includes only a first material wherein the first material is a metal material. In other embodiments, for example, the frame 24 includes a first material and a second material, wherein the first material is a metal material and the second material is a composite material having a weight that is less than the weight of the metal material such that the frame 24 has an overall weight that is less than an overall weight of a frame having only the first, metal material, the reduction in overall weight of the frame contributing to an increase fuel efficiency of the tractor-trailer vehicle.

A first trailer connector assembly 7, which in the current embodiment can be seen as a hitch 26, forms part of a tongue portion located at a first end 8 of the frame 24 for connecting the converter dolly apparatus 14 to the first trailer 12a. The connection between the first trailer 12a and the converter dolly apparatus 14 will be well understood by one skilled in the art. Although not shown, the first end 8 of the frame 24 may also include safety chains and at least one electrical connection 72, such as a wiring harness connection for enabling or securing the first trailer 12a to the apparatus 14. The electrical connection 72 is capable of delivering power from the trailer 12a to the apparatus 14, and in some embodiments for providing power and/or data signals from the apparatus 14 to the first trailer 12a. This electrical communication may extend through the first trailer 12a to the towing vehicle 13, and it may be mediated at one or more points by further converters or transformers, such as a DC-DC (direct current-direct current) converter or transformer for stepping down the high-voltage power stored in the energy storage device of the apparatus 14 to the low-voltage electrical systems of the towing vehicle 13. In some embodiments, the electrical connection 72 includes electrical connection of the kinetic energy recovery device 30 to the first trailer 12b for receiving vehicle data from the towing vehicle 13.

In some embodiments, a support leg or support apparatus 27 is also attached to the frame 24 at the first end 8. In some embodiments, for example, the support leg or apparatus 27 includes a coaster wheel.

The apparatus 14 has a second end 9 at the rear of the frame 24. The frame 24 includes at least one pair of wheels 22 rotatably mounted to the frame 24. For each one of the at least one pair of wheels 22, one of the wheels of the pair of wheels 22 is mounted on one side of the frame 24 and the other one of wheels of the pair of wheels 22 is mounted to a second opposite side of the frame 24. Each one of the wheels 22, independently, is disposed on opposite sides of a central longitudinal axis of the apparatus 14 (i.e. from front first portion 8 to rear second portion 9) and configured for rotation about an axis transverse to, or substantially transverse to, the central longitudinal axis of the apparatus (such as the axis from the left side to the right side of the frame 24). In the illustrated embodiment, the wheel pairs includes two wheels 22 to improve the load bearing capacity of the active converter apparatus 14.

In some embodiments, for at least one (for example, each one) of the at least one pair of wheels 22, the wheels are mounted to an axle. In some embodiments, the axle is rotatably coupled to the frame 24. In some embodiments, for example, the axle is a single solid shaft (e.g. driveshaft) and each one of the wheels 22 of the pair, independently, is rotatably coupled to the same shaft, such that the axle includes, or is defined by, the single solid shaft, and the single solid shaft is driven by a motor. In some embodiments, for example, each one of the wheels 22 of the pair, independently, is coupled to a respective shaft (e.g. driveshaft), such that one of the wheels of the pair is rotatably coupled to a first driveshaft and the second one of the wheels of the pair is rotatably coupled to a second driveshaft, and the first and second driveshafts are coupled to each other via a differential, such that the axle includes, or is defined by, the first driveshaft, the second driveshaft, and the differential. In some embodiments, for at least one (for example, each one) of the at least one pair of wheels 22, each one of the wheels of the pair, independently, is mounted to the frame 24 via a non-rotating shaft and is driven by a respective driveshaft (and each one of the wheels of the pair is coupled to its own electric motor-generator wheel assembly via its own driveshaft). In this respect, a first wheel on the left side of the frame 24 may be connected to a first driveshaft 110, and a second wheel on the right side of the frame 24 may be connected to a second driveshaft 111, and there is an absence of interconnection between the first and second driveshafts 110, 111, and such that such that the axle includes, or is defined by, the independent first and second driveshafts 110, 111. In some embodiments, each one of the wheels of the pair, independently, is mounted to the frame 24 via a non-rotational shaft and is coupled to its own electric motor-generator wheel assembly (e.g. via a driveshaft), such that the axle includes, or is defined by, the non-rotational shaft.

In the illustrated embodiment of FIG. 2a, a secondary trailer mounting assembly 6 is shown as a fifth wheel assembly 28 that is mounted to a top of the frame 24. The fifth wheel assembly 28 may include an upwardly facing portion having a slot for receiving a corresponding protrusion (or locking pin or kingpin) from the secondary trailer 12b for removable mounting or coupling of the secondary trailer 12b to the converter dolly apparatus 14. The fifth wheel assembly 28 is supported in some embodiments by a spring suspension system (not shown). In some embodiments, for example, the spring suspension system is for dampening displacement of the second trailer 12b along an axis perpendicular to, or substantially perpendicular to, the central longitudinal axis of the apparatus 14.

As set out above, the apparatus 14 includes a kinetic energy recovery device 30 or a charge generating system that generates an electric charge during certain mechanical actions by the apparatus 14. The electric charge in some embodiments is used to charge an energy-storing device 32, such as a battery, that is mounted to the frame 24. In some embodiments, for example, the energy-storing device 32 is housed within an enclosure or housing 34 to protect the energy-storing device 32 from any damage. In some embodiments, for example, the enclosure 34 is waterproof and durable.

Figure 2B:
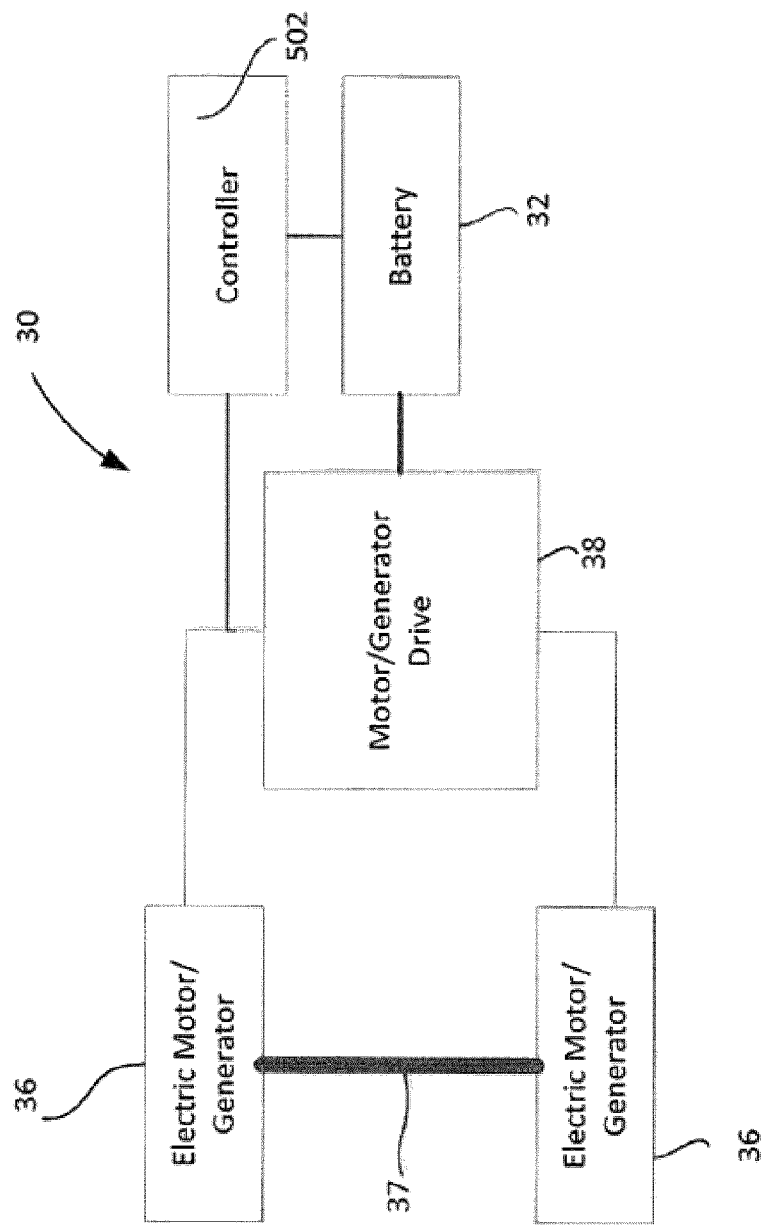
FIG. 2b is a schematic diagram of one embodiment of a kinetic energy recovery device for an active converter dolly.

A schematic diagram of the kinetic energy recovery device 30 or charge generating system is shown in FIG. 2b.

As schematically shown in FIG. 2b, the kinetic energy recovery device 30 includes a set of one or more electric motor-generators 36 (two in the example embodiments of FIGS. 2a and 3), mounted to an electric axle 37 that connects the wheels 22 (as shown in FIG. 2a). The motor-generators 36 are used to convert the electric energy stored in the energy-storing device 32 to mechanical energy by applying a motive rotational force to the wheels 22 thereby rotating the wheels 22 (drive mode), or to convert mechanical energy from the rotating wheels 22 into electric power (generator mode) by applying a regenerative braking force to the wheels 22 thereby braking or effecting deceleration of the wheels 22. In the example embodiments of FIGS. 2a, 2b, and 3, the electric motor-generators 36 are located proximate the wheels 22 of the apparatus 14. In some embodiments, for example, each wheel 22 includes a hub wherein the electric motor generators 36 are mounted within the respective hub of the wheels 22. Although two motor-generators 36 are shown, it will be understood that the kinetic energy recovery device 30 may include only a single motor-generator (such as located along the axle between the two wheels 22 through a differential 116) or may include more than two motor-generators 36. The motor-generator 36 controls the movement of the wheels 22 via the axle 37 based on signals transmitted from a dolly controller 502. The controller 502 will be described in more detail below.

The energy-storing device 32 stores energy generated by the kinetic energy recovery device 30. In some embodiments, a motor-generator drive 38 receives the electric power generated through regenerative braking of the apparatus 14 to charge the energy-storing device 32; the motor-generator drive 38 can later use this stored power to power the electric motors 36. In some embodiments, kinetic energy may be converted into electric form by regenerative braking when the truck's engine is running at high efficiency and the battery is at low charge.

The active converter dolly apparatus 14 may further include a plurality of onboard instrumentation within a control system or controller 502 that communicate with equipment, such as sensors 40, that may be used for, among other applications, assistance with steering and stability. In some embodiments, the sensors 40 may be used to assist in aligning the first and second trailers 12a and 12b when the tractor-trailer 10 is moving in reverse. In some embodiments, the sensors 40 may be used to detect low-traction conditions and stabilize the vehicle in motion. These applications are set out in further detail below.

Furthermore, in some embodiments, sensors may be used to help identify the relative position of the converter apparatus 14 to other elements or components of the tractor-trailer 10. The output from the sensors 40 can be fed into one or more dolly control systems (located within the enclosure 34 in some embodiments), when such information can be used to control the apparatus 14. (A schematic diagram of a dolly control system is shown and described in more detail below with respect to FIG. 5.)

Figure 3:
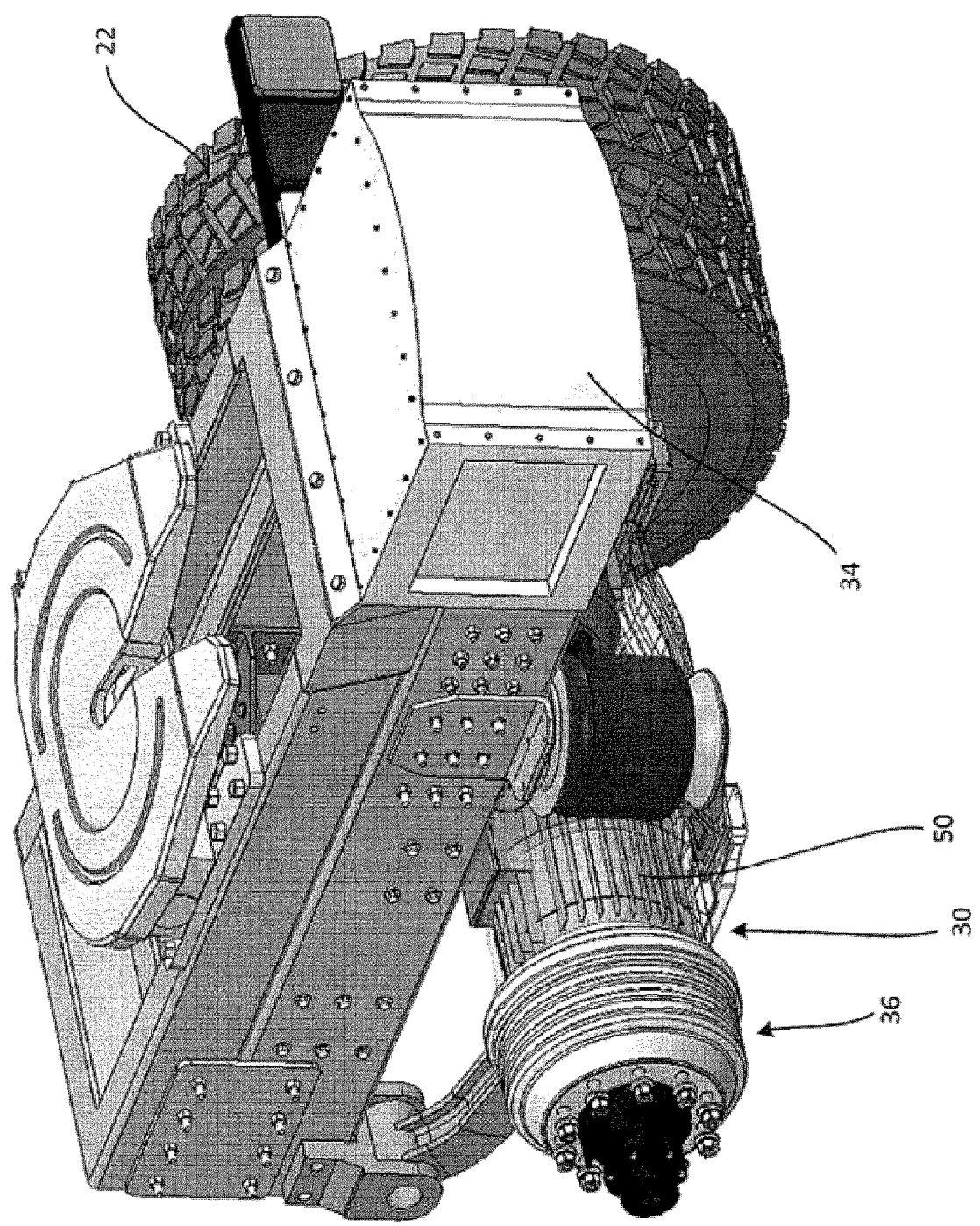
FIG. 3 is a perspective view of the active converter dolly.

FIG. 3 is a schematic rear view of the dolly of FIG. 2a. Some components of the dolly have been removed for ease of understanding of the disclosure. For instance, one set of wheels 22 and parts of the frame 24 have been removed.

In some embodiments, for example, the kinetic energy recovery device 30 includes an electric motor-generator wheel assembly 50 that can be seen as an integrated electric motor wheel assembly. Although not shown, a similar wheel assembly is preferably mounted adjacent the other wheel 22. These two electric motor-generator wheel assemblies 50 may in various embodiments include two motor-generators 36 driving two axles (one for the wheels 22 on each side of the frame 24), one or more motor-generators 36 driving a differential 116 attached to two drive shafts 110,111, or one or more motor-generators 36 driving a single common axle attached to the wheels 22 on both sides of the frame 24.

In operation, as the tractor-trailer 10 starts to brake, the motor-generator wheel assembly 50 captures the kinetic energy of the apparatus 14, with this energy flowing via the motor-generator drive 38 to the energy-storing device 32. The combination of electric motor-generators 36 and drive 38 converts the kinetic energy into electricity before it is transmitted to the energy-storing device 32.

In some embodiments, braking of the tractor-trailer vehicle 10 is detected through the brake lines and/or the electrical connection 72 from the towing vehicle 13 to the dolly apparatus 14. In other embodiments, this method of braking detection may be replaced or supplemented with one or more sensors incorporated into the apparatus 14 to detect acceleration and deceleration and to operate the drive mode and generator mode of the motor-generators 36 accordingly. For example, some embodiments may eliminate the need for real time braking data from the towing vehicle 13 by incorporating one or more force sensors into the dolly 14. The force sensors may be strain gauges and/or load cells to sense the pull/push forces. The force sensors may be located somewhere on the frame 24, on the second trailer connector assembly 6, or on the first trailer connector assembly 7. In the example embodiment shown in FIG. 14, force sensors 80 such as strain gauges are incorporated into the pintle hook or hitch 26 forming the first trailer connector assembly 7. These force sensors 80 are configured to detect compression and tension in the hitch 26, corresponding generally to braking (deceleration) and acceleration of the tractor-trailer 10. When the converter dolly 14 is being "pulled" (e.g. when the hitch is under tension), the motor-generator 36 will apply tractive motive rotational force or motive rotational force to reduce the pull force (drive mode), hence assisting the towing vehicle 13 engine to pull the trailer load. On the other hand, when the converter dolly is being "pushed" (e.g. when the hitch 26 is under compression), the motor-generator 36 will be in the regenerative braking mode (generator mode) to reduce the "push force", thus harvesting the kinetic energy of the trailer during braking. A close-loop PID controller can be used in some embodiments to minimize the "pull" or "push" force at the force sensors 80 by fine-tuning the PID coefficients. Additionally, some embodiments may use two additional force sensors 80 on left and right sides of the converter dolly's pintle hook or hitch 26 to measure the force vector acting on the electric converter dolly 14. The force vector will provide left or right direction vector information in addition to knowing whether the converter dolly is being "pulled" or "pushed". The pintle hook or hitch 26 with the load cell sensors 80 may in some embodiments be designed as a replaceable component, to allow ease of replacement in the case of broken sensors. In some embodiments, such a control system will not require any information from the towing vehicle 13, thus allowing the electric converter dolly 14 to be a complete standalone unit.

A battery and control enclosure 34 is mounted on the frame 24. In various embodiments it may be mounted to the frame 24 on the sides, the rear second end 9 as shown in FIG. 2a, or close to the front first end 8 as described below with respect to the embodiment of FIG. 14. The control enclosure 34 may be formed from a durable waterproof and corrosion resistant material such as a composite or aluminum, which may be lightweight for fuel economy reasons. By being both waterproof and corrosion resistant, the enclosure 34 in some embodiments provides a durable compartment for the converter apparatus 14.

Figure 4:
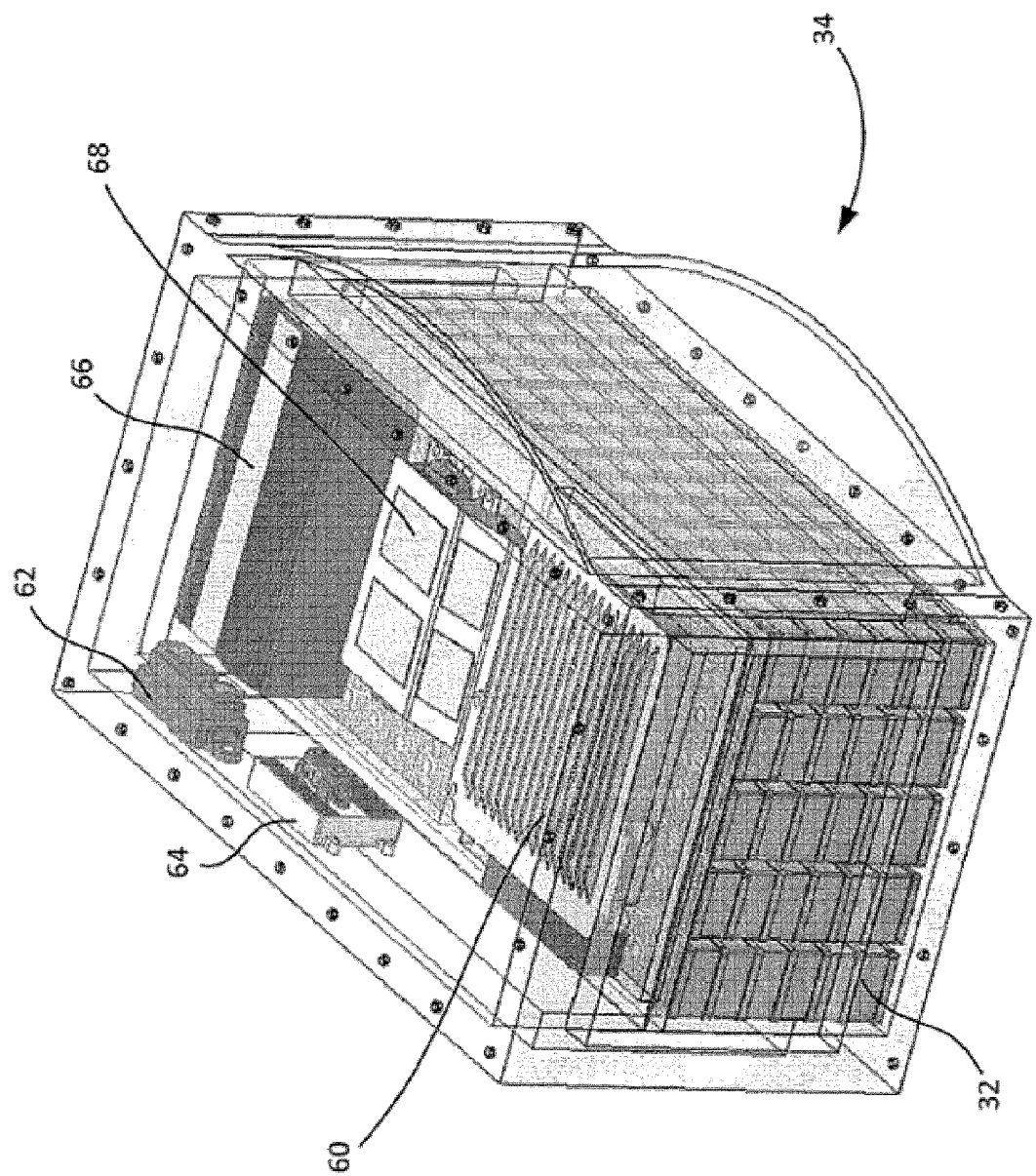
FIG. 4 is a perspective view of a battery enclosure of the active converter dolly.

Turning to FIG. 4, a perspective view of one embodiment of a battery enclosure 34 is shown. As illustrated, the walls of the enclosure 34 are shown as being transparent so that the contents of the enclosure can be seen.

In this embodiment, the enclosure 34 houses a control module 60 and an energy-storing device 32 (shown here as a battery). The control module 60 may in various embodiments performs multiple functions for the apparatus 14. In some embodiments, the control module 60 is used to monitor and control the energy-storing device 32. It can also be used to control the motor-generators 36 through their drives 38 in both drive mode and generating mode. Furthermore, the control module 60 may monitor and control the charging of the energy-storing device 32, such as via external plug-in sources. The control module 60 may also include an intelligent power dispatch system to determine when to power the wheels via the motor-generators 36. Furthermore, the control module 60 may include an intelligent steering system to control braking and traction of opposite wheels, or to provide shunting operation of the active converter dolly, or both. In some embodiments, the control module 60 may be used to set up the kinetic energy recovery device 30 for regenerative braking or for providing auxiliary power depending upon the road circumstances and the condition of the load on the tractor engine. The operation of the controller in various embodiments is described in greater detail below.

In some embodiments, for example, the enclosure 34 also houses the energy-storing device 32, which in the preferred embodiment is a modular lithium-ion battery system. The enclosure 34 may also house a sensor interface 62 which communicates with the sensors 40 located throughout the dolly. The sensor interface 62 may communicate with the sensors 40, to assist, for example, with using the apparatus 14 to direct the steering of the trailer(s) when the tractor trailer is moving in reverse. While shown separately, the sensor interface 62 can be integrated within the control module 60.

In some embodiments, the enclosure 34 may also house a gyroscope sensor 64 attached to the frame 24 and an off-board power interface 66. The gyroscope sensor 64 may be in communication with the dolly control system to transmit signals which can be used, for example, as part of a self-balancing control system for the converter dolly apparatus 14. In some embodiments, for example, the controller 502 may receive and process the signals from the gyroscope sensor 64 and use self-balancing data from the signals (e.g. data on the angular pitch acceleration of the apparatus 14 about a left-to-right central axis of the apparatus 14) to drive the motor-generators 36 to control rotation of the wheels 122 to maintain the level orientation of the apparatus 14 in a self-balancing mode. In the event that the apparatus 14 is self-balancing, the presence of a support leg or support apparatus 27 may not be necessary.

The off-board power interface 66 may be used to connect the energy-storing device 32 to off-board charging systems or off-board loads. The enclosure 34 may include a communication interface 68 that communicates with towing vehicle engine information system. In some embodiments, the communication interface 68 is part of the control module 60. It may in various embodiments be a wired electrical or a wireless communication interface, such as a radio interface (using a wireless protocol such as e.g. 802.11), and it may communicate with the towing vehicle 13 via the tractor's on-board diagnostics (OBD-II) port. The communication interface 68 may in some embodiments be able to access controller area network (CAN) bus data from the towing vehicle 13. In some embodiments, the communication interface 68 may be able to send data from the apparatus 14 to the towing vehicle 13, such as control signals used to control vehicle systems in the towing vehicle 13.

The communication interface 68 may be configured to receive various types of data from the towing vehicle 13, and in some embodiments from the first trailer 12*a* as well. This data may include the throttle level of the main tractor; the engine motive rotational force; the engine speed; the parking brake state; the transmission state; the brake activation state; or any other information accessible in the towing vehicle 13. This data may in various embodiments be used by the active converter dolly control system to determine when to recover, and when to expend, recovered energy to assist in increasing the fuel economy of the tractor-trailer system.

In some embodiments, a forward exterior surface of the battery enclosure 34 may be configured to reduce drag. Various aerodynamic profiles can be used, and the profile shown in FIG. 3 is not intended to be limiting. In some cases, the low positioning of the battery enclosure may allow for a ground effect design to be employed, meaning that the shape will take into account both the passage of air from in front and past the leading edge, as well as air passing below the leading edge between the leading edge and the ground. In some embodiments, for example, the enclosure 34 may also house a cooling system for cooling the energy-storing device 32 and the other electronic components housed within the enclosure 34. In some embodiments, for example, the cooling system is liquid cooled, while in others it is air cooled. In some embodiments, the enclosure 34 is located at a low level between the wheels 22 such that the weight of the battery and control systems within the enclosure 34 are located as low down as is practical to have a lower centre of gravity to improve road handling and control of the apparatus 14 during transport. Accordingly, in some embodiments, the housing or enclosure 34 is disposed on or mounted to the frame such that the apparatus has a centre of gravity disposed below a central, midline axis of the apparatus. In another embodiment, the system may include a lightweight composite chassis or frame 24 which is aerodynamic by design and includes one or more enclosures 34 for the batteries and controls.

Figure 5A:
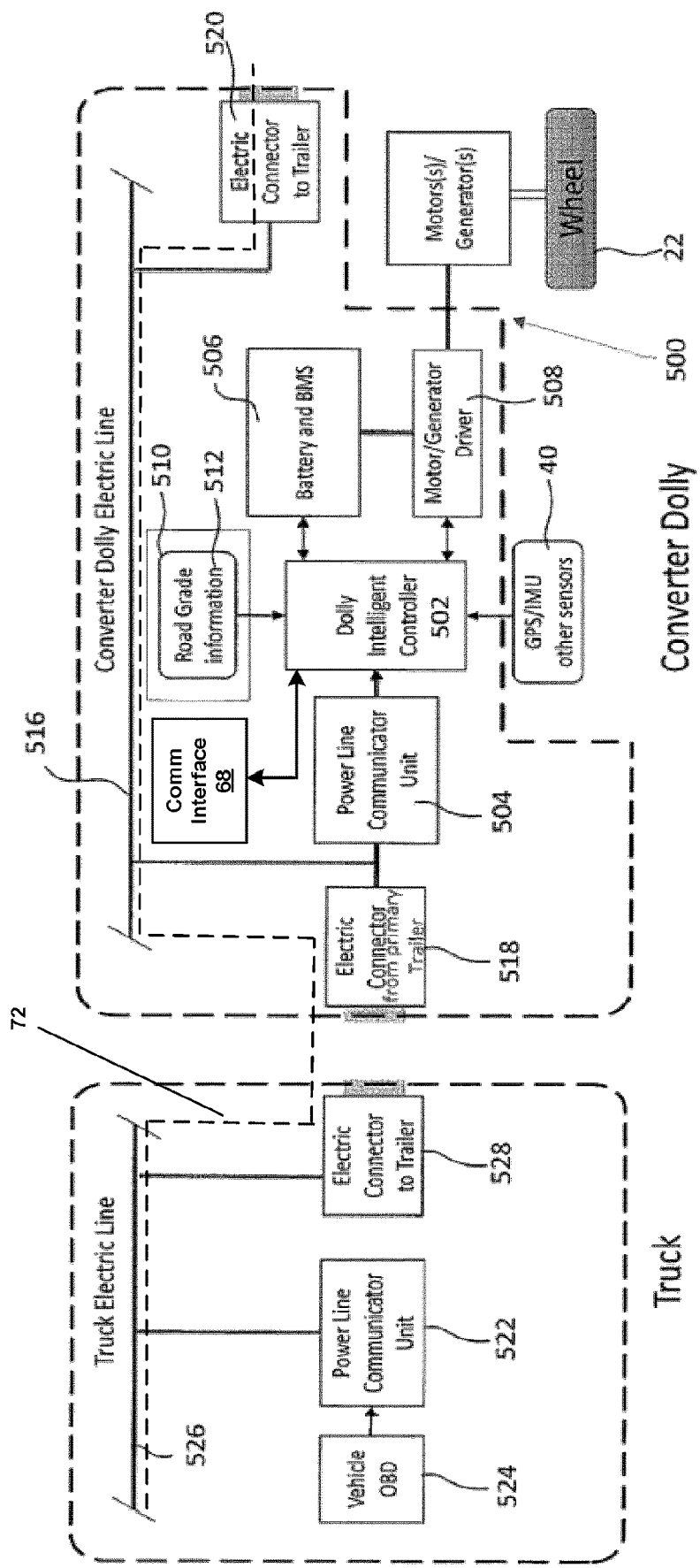
FIG. 5a is a schematic view of an active converter dolly control system.

Turning to FIG. 5*a*, a schematic diagram of a control system 500 for the apparatus 14 is shown. In the illustrated embodiment, certain components of a second trailer 12*b* which are in communication with the apparatus control system 500 are also schematically shown.

The apparatus control system 500 includes an intelligent controller 502 which is, in some embodiments, implemented within a central processing unit (CPU). In the illustrated embodiment, the controller 502 is in communication with the tractor OBD (on-board diagnostics) unit, such as an OBD-II port, via a power line communicator unit 504 to receive the tractor or truck (e.g. tractor, truck, car or cab) and tractor engine information. Wireless communication, such as a radio-based communication interface, can also be used instead of or in addition to the power line communicator unit 504 to connect the tractor OBD to the dolly control system 502. The dolly control system 502 may also communicate information to the towing vehicle 13 via the communication interface 68 in some embodiments.

The dolly control system 502 also communicates with the set of sensors 40, such as but not limited to, a global navigation satellite system (GNSS) tracking devices, such as global positioning system (GPS) transceiver, an Inertial Measurement Unit (IMU) sensor, one or more wheel speed sensors 70, 71 each placed on one of the wheels 22 or axles of the apparatus 14, one or more linear accelerometers 74, and/or the gyroscope sensor 64. The wheel speed sensors 70, 71 measure individual wheel speeds of the dolly apparatus 74 to capture magnitude and direction (e.g., forwards or backwards) of the dolly apparatus 74, as described elsewhere herein. The gyroscope sensor 74 and the linear accelerometer 74 may be mounted onto the frame 24 around the center of the dolly apparatus 74. The gyroscope sensor 64 may be used to monitor angular acceleration of the dolly apparatus 74 and the linear accelerometer 74 will be used to sense the linear acceleration of the dolly apparatus 74 as described elsewhere herein, as described elsewhere herein.

The intelligent controller 502 may be use the sensor data to trigger a corrective response. The wheel speed sensors 70, 71 monitor individual wheel speeds and may trigger the corrective response when the difference of the wheel speed is larger than a preset threshold, as described elsewhere herein. This may occur when one wheel is slipping and spinning much faster than the other wheel on the same axle. This scenario indicates the vehicle is losing traction and in most cases losing control. ☐The accelerometer 74 combined with the gyroscope sensor 64 monitor the linear and angular acceleration of the dolly apparatus 74. When the vehicle is moving forward (i.e., longitudinal direction), a sudden increase in the angular acceleration around the vertical z-axis (i.e., yaw motion) may trigger a corrective response.

The intelligent controller 502, in the case of one motor drive system, connects to a differential and transfers power to the two wheels. When slipping of the wheels or a sudden increase of yaw acceleration are detected, an electronic locking device wheel will lock the differential drive, effectively turning it into a solid axle. This action will transfer the motive rotational force to the wheel with traction, thereby reducing the instability of the dolly apparatus 74. Additionally, when slipping of the wheels occurs, the intelligent controller 502 will cut power to the motor to reduce the motive rotational force output to the wheels.

In the case of independent wheel motors drive system, individual wheel speed and motive rotational force will be controlled by the intelligent controller 502. When a wheel slipping occurs, the intelligent controller 502 will control the speed of the wheels via motive rotational force command to match the corresponding vehicle speed. When a sudden yaw acceleration occurs, the intelligent controller 502 will adjust the motive rotational force applied to the wheel in the opposite direction to counter the detected yaw acceleration, thereby reducing the overall yaw acceleration of the dolly apparatus 74.

When the speed difference of both wheels on the same axle and/or the yaw acceleration of the dolly apparatus 14 is reduced to the preset threshold, the intelligent controller 502 will stop applying the corrective motor response.

The intelligent controller 502 is also in two-way communication with a battery and battery management system (BMS) unit 506 and a motor-generator drive 508 in some embodiments. The battery and BMS unit 506 is also connected to the drive 508. The motor-generator drive 508 is further connected to, or in communication with, the set of motor-generators 36 (see FIG. 2*b*) that are associated with an individual wheel 22. As schematically shown in FIG. 2b, the number of motor-generators 36 in the illustrated set is two.

The intelligent controller 502 is also connected to a database 510 including road grade information 512 which can be stored within a database or based on sensor information, or real time road information by connecting the dolly intelligent controller 502 to wireless network.

Separate connectors, seen as an electric connector from the trailer 518 and an electric connector to the trailer 520 are also connected to the electric line 516. As will be understood, one of the connectors 518 or 520 is connected to the first trailer and the other connector is connected to the second trailer.

The intelligent controller 502 may in some embodiments further include an interface of a module allowing the controller to be monitored by a user over the Internet, such as via the communication interface 68.

The truck or tractor includes a power line communication unit 522 that converts information from a vehicle on-bard diagnostics (OBD) system 524 to be sent via the truck electric lines. In another embodiment, the OBD information can be converted and transmitted wirelessly, such as via the communication interface 68. The truck or tractor power line communication unit 522 is connected to the electric line 526 which, in turn, is connected to an electric connector to a trailer 528, In use, the electric connector to trailer 528 and the electric connector from trailer 518 are connected via a cable to each other to deliver power and OBD information from the truck to all the connected trailers and dollies to the tractor.

Collectively, the electric connector from the trailer 518, electric connector to the trailer 520, electric line 516, electric line 526, and electric connector to a trailer 528 shown in FIG. 5 all form part of the electrical connection 72 configured in various embodiments to carry information, or electrical power, or both between the various tractor-trailer vehicle 10 components (i.e. the towing vehicle 13, the first trailer 12a, the dolly apparatus 14, and the second trailer 12b).

In some embodiments, the transmission of signals between the vehicle OBD 524 and the intelligent controller 502 is via the electric line when the signals from the vehicle OBD are converted by the power line communicator unit 522 which then uploads the converted signal to the truck electric line. At the dolly end, the signals are received by the power line communication unit 504 which then extracts the converted OBD signals and then decrypts or converts these signals into a format understood by the controller 502. In another embodiment, the signals may be communicated or transmitted wirelessly between the vehicle OBD and the intelligent controller using the communication interface 68.

In operation, as the tractor-trailer is in motion, the intelligent controller 502 receives and transmits signals to the other components of the controller system. For instance, the intelligent controller 502 can communicate with the sensors 40 to receive signals representing various data that the controller 502 can use to assist in improving operation of the tractor-trailer and the dolly.

Figure 5B:
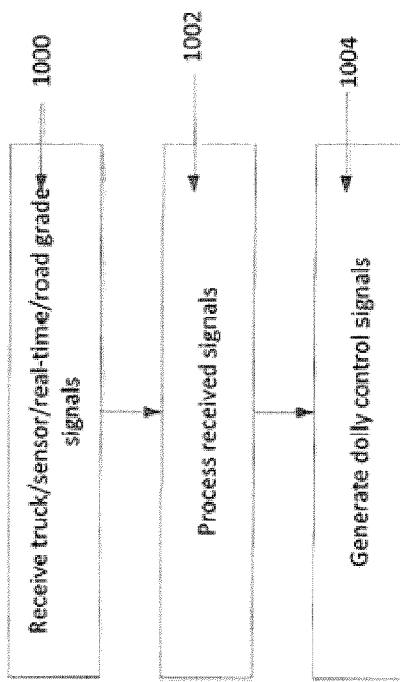
FIG. 5b is a flowchart outlining one embodiment of controlling an active converter dolly.

A method of convertor dolly control is shown with respect to FIG. 5b. As the truck is driving, the vehicle OBD 524 collects various truck information with respect to characteristics of the truck. For instance, this information may include, but is not limited to, a position of the brake pedal or braking motive rotational force, amount of motive rotational force being generated by the engine, the speed of the engine, etc. The sensors may also collect sensor information associated with various dolly characteristics such as listed above. Other information may include road grade information, map information or any real-time information and the like.

All, or parts of this, information is then transmitted to, and received by, the intelligent controller 502 within the dolly (step 1000). In terms of the signals received from the vehicle OBD, in some embodiments, the digital signals from the vehicle OBD 524 are converted by the power line communication unit 522 and then transmitted over the truck electric line 526. These signals are then retrieved, or received, by the power line communicator unit 504 within the dolly and then extracted, and, if necessary, re-converted before being received by the controller 502. As will be understood, the power line communicator unit 504 converts the extracted signals into a format understandable by the controller 504. As will be understood, due to the connection between the dolly and the trailers (via the connectors 518 and 520), the dolly control system 502 has access to any signals and electricity that is transmitted over the electric line 526.

In some embodiments, the digital signals may be transmitted wirelessly from the vehicle OBD 524 to the controller 502 via the communication interface 68.

After the controller 502 receives the digital signals, the controller processes the signals (step 1002) and then generates dolly control signals to control the dolly (step 1004) based on the digital signals. The dolly control signals may also be seen as motor-generator drive control signals.

For instance, if the towing vehicle 13 is braking, the controller 501 may receive digital signals representing the level of braking being applied to the truck. In one embodiment this is determined by the vehicle OBD by monitoring the position of the brake pedal within the truck. After receiving the digital signals, either directly from the vehicle OBD or converted by the power line communicator unit, the controller can generate and send a signal to the motor-generators 36 (via the motor-generator drive 508) to apply a corresponding regenerative brake motive rotational force. In this manner, during this regenerative braking, the battery can be charged based on the braking motive rotational force value calculated by the controller.

In another embodiment, the controller 502 may receive a digital signal indicating that the truck is being started. If the battery is charged or has some charge, the controller may generate and transmit a signal to the motor-generator to apply or generate a motive rotational force to assist startup of the truck to improve the efficiency of the truck motor.

In another embodiment, if the state of charge (SOC) within the dolly's battery is low, signals relating to the truck engine's maximum efficiency may be received by the controller whereby the controller may then generate and transmit a signal to the kinetic energy recovery device to charge the battery when possible.

Figure 5C:
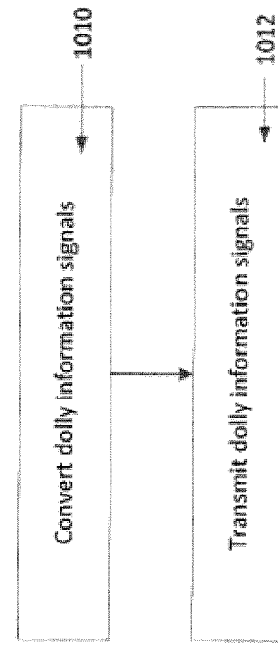
FIG. 5c is a flowchart outlining one embodiment of transmitting signals from the converter dolly control system.

Turning to FIG. 5c, a flowchart outlining a method of communication from the dolly control system is shown. Initially, dolly information signals, which are typically digital, may be converted (step 1010) if they are being transmitted to a truck driver over the electric line as discussed above. The dolly information may include information relating to the dolly's position, the battery charge, or the like.

The dolly information signals are then transmitted (step 1012) to specified destinations or individuals, such as, but not limited to, the truck driver or a fleet manager. As will be understood, the signals may be transmitted wirelessly via the communication interface 68 or via the electric line 526 to the truck driver. The step of signals being transmitted to the fleet manager is generally performed wirelessly.

The active converter apparatus 14, as outlined above, may be considered in some embodiments a TTR hybrid system. As such, the dolly apparatus 14 in some embodiments operates in different operational modes.

In one mode, the active converter dolly 14 does not participate in extracting or providing power to the tractor-trailer system. In this mode the converter dolly will be passive. In another mode, sometimes referred to as an anti-idling mode, auxiliary loads (for example cabin's or trailer's A/C system) are driven by the kinetic energy recovery device 30 of the dolly 14 or the stored energy in its energy storing device 32. In yet another set of modes, such as a drive mode and a stability-assistance mode, the energy in the dolly's energy storing device 32 is used to provide traction motive rotational force in the dolly's tires 22 to assist the motion of the tractor-trailer vehicle 10. In another mode, referred to as generator mode, the dolly is used to extract and convert the mechanical power in the rotation of its wheels into electric power via its motor-generators using regenerative braking. The electric power then can be stored in the energy storing device 32 and/or run auxiliary devices of the tractor-trailer vehicle 10. This mode may activated during regenerative braking or when the truck-trailer drives downhill, or when the energy storing device 32 needs to be charged, in which it may be activated when the engine is operating at high efficiency.

In a further mode, called electric-vehicle (EV) mode, the dolly apparatus 14 may use the power stored in the energy storing device 32 to power the motor-generators 36 to push the entire tractor-trailer vehicle 10 forward when it is moving at low speeds. In another mode, called backup-assistance mode, the motor-generators are employed to stabilize and straighten the tractor-trailer vehicle 10 when backing up.

Some of these modes are described in more detail below.

In further designing one embodiment of the dolly, certain driving conditions are considered. These conditions may include, but are not limited to, acceleration (when the vehicle's velocity is increasing); deceleration (when the driver releases the accelerator pedal and may press the brake pedal); and cruising (when the road load and the vehicle's velocity are constant).

Figure 7:
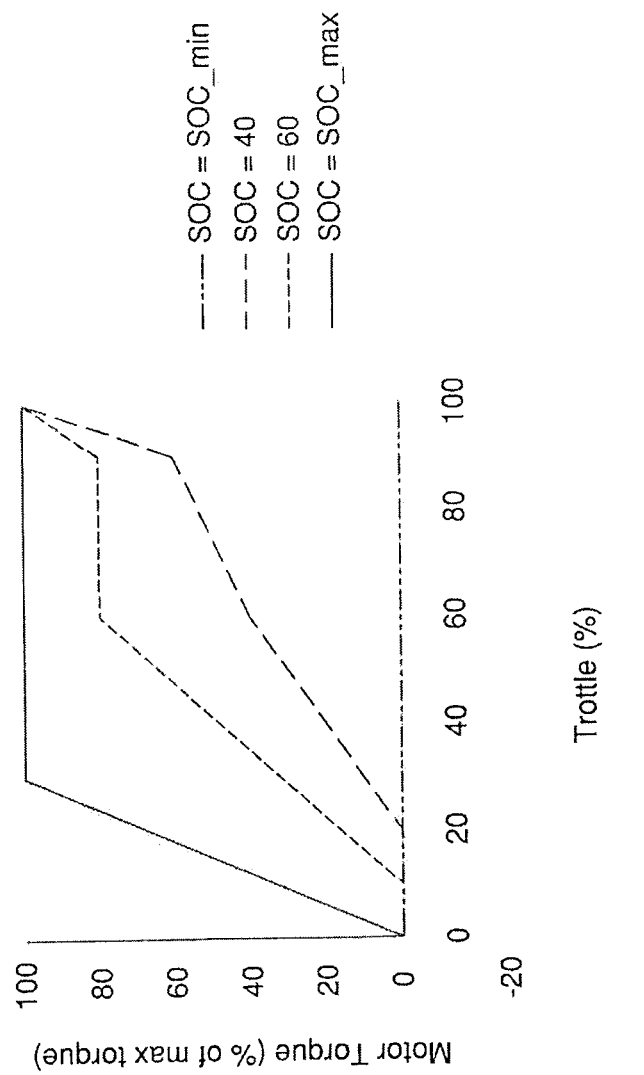
FIG. 7 is a chart outlining motor motive rotational force vs. throttle.

An example of drive mode is as follows. During acceleration, if there is enough charge in batteries, and when the state of charge (SOC) of the battery is greater than the SOC threshold acceleration, the dolly may assist the truck's powertrain via the electric motor associated with the dolly wheels, providing an additional boost motive rotational force in addition to the motive rotational force generated by the tractor. In one embodiment, the SOC threshold acceleration can be a predetermined threshold calculated via experiments or system optimization calculations. This boost motive rotational force depends on vehicle speed, the battery's SOC, and the accelerator pedal position. A sample map for electric motor output during acceleration at a sample vehicle speed equal to 50 km/h for various battery SOCs is shown in FIG. 7.

Figure 8:
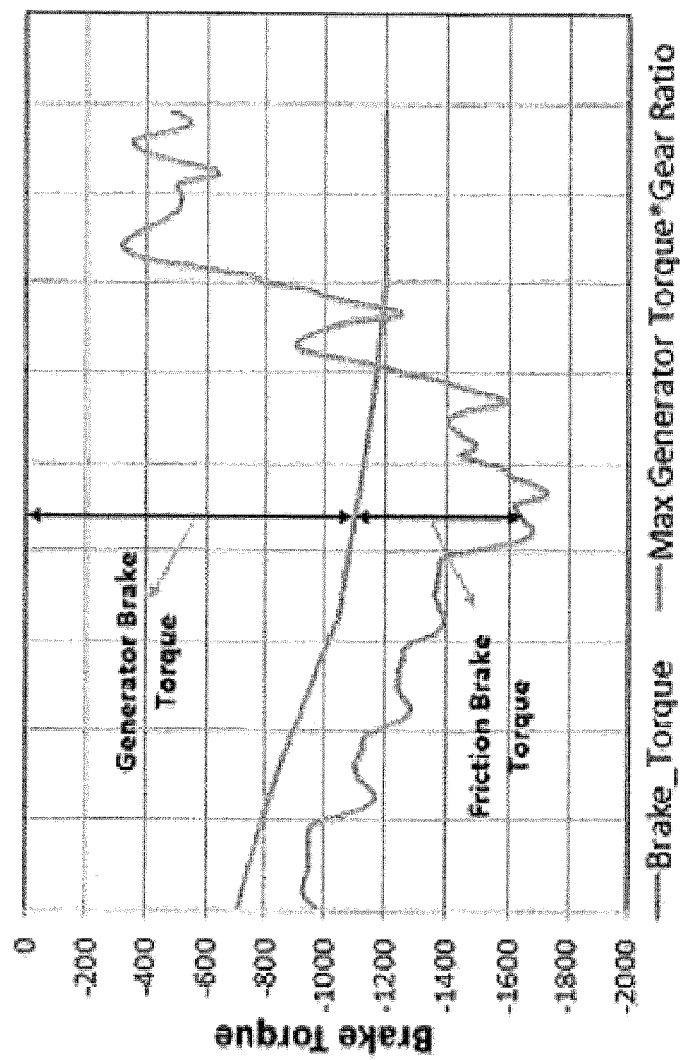
FIG. 8 is a chart outlining showing regenerative and friction brake motive rotational force blending.

An example of generator mode is as follows. During deceleration, if the battery is or batteries are not fully charged, the dolly 14 typically does not assist the truck or other towing vehicle 13 nor add any load to the truck to extract any energy. During coasting and based on the battery's SOC, the dolly 14 may extract power via the motor-generator 36 for charging the batteries 32. However, when the brake pedal is depressed, parallel regenerative braking is actuated. Depending on vehicle speed and consequently, the generator's rotational speed, for approximately 10-20% of initial brake pedal travel, the friction brakes are not engaged and only regenerative braking is applied. During harder braking conditions, depending on the value of generator speed and max motive rotational force, the braking energy may not completely regenerated. In these situations, the excessive amount of braking motive rotational force is applied by friction braking, as shown in FIG. 8. This process is called brake motive rotational force blending.

Figure 9B:
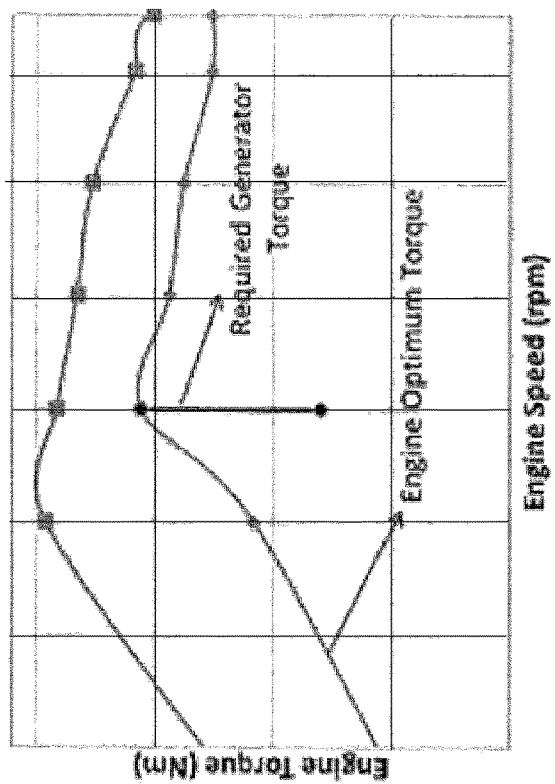
FIG. 9b is a chart outlining engine motive rotational force vs engine speed for a second active converter dolly operational mode.
Figure 9A:
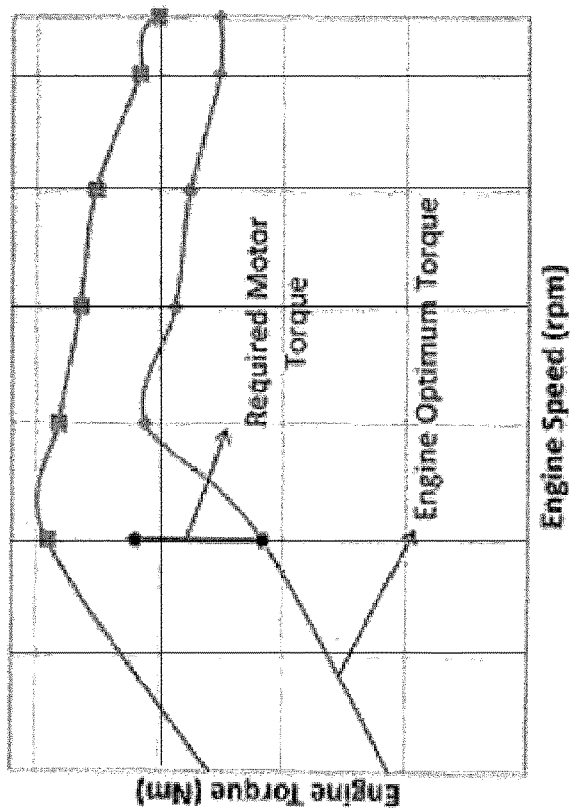
FIG. 9a is a chart outlining engine motive rotational force vs engine speed for one active converter dolly operational mode.

An example of alternating drive mode and generator mode is as follows. During cruising, depending on the status of load, or drive motive rotational force, relative to optimum load, or drive motive rotational force, the dolly 14 may assist the truck powertrain, being in drive mode, or extracting power via the generator in generator mode. In this situation, if the truck powertrain motive rotational force is greater than the optimum motive rotational force of the engine at that speed, the dolly will be in assist mode (i.e. drive mode), in which the electric motor of the motor-generator 36 provides a boost motive rotational force in addition to the truck motive rotational force output, as shown in FIG. 9a. Consequently, there is a lower motive rotational force request from the engine due to the available motor motive rotational force, which results in a more-efficient tractor operating point. Finally, if the engine toque is less than the optimum load, or drive motive rotational force, the dolly 14, depending on the SOC of the battery 32, will be in generator mode: the truck powertrain delivers its power to the load and the load delivers power to electric powertrain, as shown in FIG. 9b. In this situation, some portion of engine power is stored in the batteries 32 by the motor-generator 36, and the extra requested motive rotational force from the drive of the towing vehicle (such as an internal combustion engine, ICE) moves the current towing vehicle drive operating point to a more efficient one.

With respect to some embodiments of the active converter dolly, certain characteristics of the dolly are required. More specifically, power and performance, powertrain configuration, and steerability are taken into account in the design of some embodiments of the active converter dolly 14.

With respect to the powertrain configuration, two scenarios, seen as an in-wheel motor embodiment and a drive axle embodiment can be considered.

Figure 10:
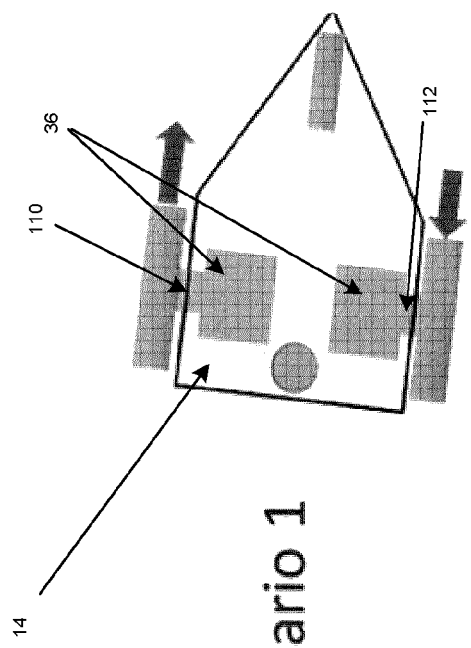
FIG. 10 is a schematic diagram of another embodiment of a kinetic energy recovery device.

For embodiments with an in-wheel motor configuration, the kinetic energy recovery device 30 includes two drive shafts 110,111 with two in-wheel motor-generators 36, such as schematically shown in FIG. 10. As shown in FIG. 10, the apparatus 14 is connected to the second trailer 12b. The motor-generators 36 can provide the required power for driving, and by applying different traction forces, it can play the role of a steering system. While this configuration may require a higher level of modification to be retro-fitted into existing converter dollies, it may more suitable for Vehicle Dynamic Control (VDC) applications because the left and right motors can be operated independently to provide different traction/braking motive rotational force to each wheel. By controlling this properly, a corrective yaw moment is formed, which can be used to improve dynamical behaviour of the combination of the towing vehicle, trailers, and the converter dolly.

Figure 11:
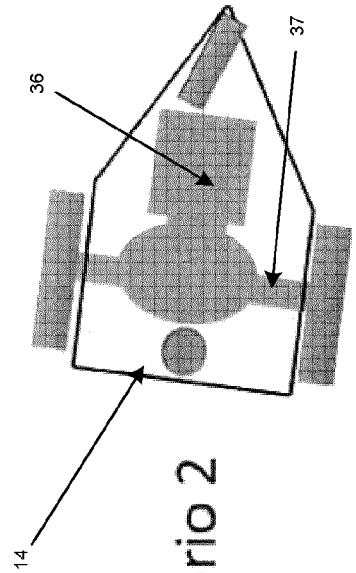
FIG. 11 is a schematic diagram of a further embodiment of a kinetic energy recovery device.

For the drive-axle embodiment, in this configuration, the axle 37 is a drive axle such as schematically shown in FIG. 11. Unlike the system of FIG. 10, the level of modification for this configuration is lower. Furthermore, in some embodiments, the motor-generator includes a motor-generator reduction gear which can also be embedded into the axle 37 (double reduction axle).

When the active converter dolly or apparatus 14 is disconnected from a first trailer 12a but still connected to a second trailer 12b, the apparatus 14 can be used to move the second trailer 12b without having to go through the hassle of re-mounting the first trailer 12a. With respect to steerability, in the in-wheel motor configuration shown in FIG. 10, the steering may be altered by differential motive rotational force applied by each motor-generator 36. In the drive-axle configuration shown in FIG. 11, a steering mechanism 1200 may be integrated with the converter dolly 14. A schematic of the steering mechanism 1200 that can be used for an active converter dolly 14 is shown in FIG. 12. The steering can be achieved by using a motor 1202. Either an electric or a hydraulic linear actuator 1204 can also provide the retractability of the steering mechanism, which can also be seen as a third wheel assembly or coaster wheel 1206. However, since using a hydraulic actuator may require additional power sources and accessories (hydraulic power and connections), some embodiments may use an electric linear actuator. In some embodiments, for example, a steering device for releasably coupling to the steering mechanism is provided for assisting with steering of the apparatus 14 and second trailer 12b when the apparatus 14 and second trailer 12b are disconnected from the first trailer 12a. In some embodiments, for example, the steering device includes a steering column and steering wheel.

Figures 13A, 13B:
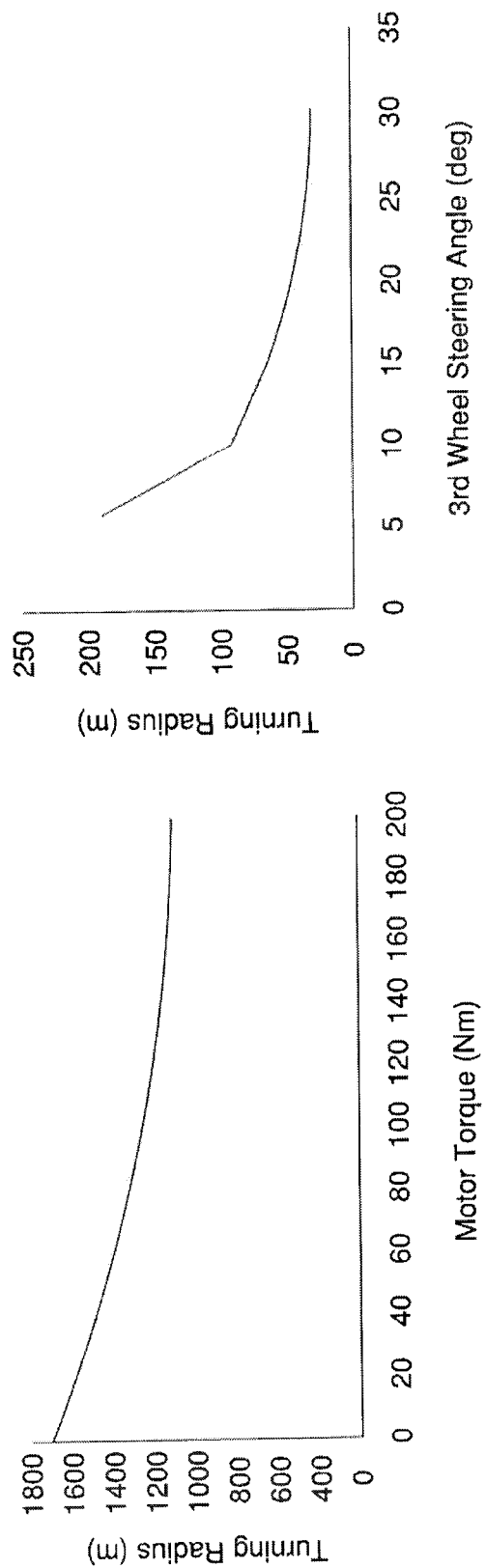
FIGS. 13a and 13b are charts outlining turning radius with respect to different active converter dolly apparatus configurations.

Using the related equation of motion for the articulated vehicles, the steerability of both configurations (of FIGS. 10 and 11) were investigated. FIGS. 13a and 13b illustrate the turning radius of the trailer equipped with an active converter dolly with differential motive rotational force steering (FIG. 13a) and steering mechanism (FIG. 13b) configurations.

It can now be appreciated that the active converter dolly or apparatus 14 may not only improve fuel economy when it is attached to the tractor-trailer but can also be used to shunt a trailer when it is not attached to a trailer with adding a steering mechanism. Although not shown, a steering wheel, joystick, or other interfaces can also be included to communicate with the dolly controller to enable a driver locally or remotely to steer the dolly. As such, the dolly can be used to shunt the second trailer around a staging area even when the second trailer is disconnected from the tractor. This may be to place the second trailer in position for loading or unloading, or to place it in position for being attached to a trailer. Because the apparatus 14 is equipped with a steering system and by the dolly control system, the apparatus 14 can be directed or steered into position. In some embodiments, the steering can be manually applied, such as by way of a remote control device. Such a device may be a joystick, smart phone or tablet device which includes software access to the steering control or mechanism. In this way the apparatus 14 can be controlled remotely while it is being maneuvered into position. Collision avoidance sensors may also be used to help avoid accidents. The collision avoidance sensors may be ultrasonic sensors, LIDAR, RADAR, or other suitable proximity detector sensor. The collision avoidance sensors may be mounted on the second trailer 12b or may be mounted on the apparatus 14 in a way that permits the dolly sensors to see past the edges of the second trailer 12b for collision avoidance.

In some examples, a steering device may be coupled to the steering mechanism. The steering device may be communicatively coupled to the controller for locally or remotely steering the apparatus 14 by an operator (e.g. driver), the apparatus 14 being operable by the steering device to shunt the second trailer 12b around a staging area when the second trailer 12b is disconnected from the towing vehicle 13. The steering device may comprise a steering wheel or joystick mounted to the apparatus 14. The steering device may be a wireless communication device for wireless communicating with the controller, such as a wireless remote control having a steering wheel or joystick, smartphone or tablet, the wireless communication device having control software for providing a user interface for steering the apparatus via user interaction therewith.

The collision avoidance sensors may be communicatively coupled to the controller. The collision avoidance sensors may be mounted to the apparatus or the second trailer to detect any objects within a threshold distance of the apparatus or the second trailer, and the controller configured to generate an alert when an object is detected within the threshold distance of the apparatus or the second trailer. Alternatively, the controller may be configured to send a notification of the steering device when an object is detected within the threshold distance of the apparatus or the second trailer, with the steering device configured to generate an alert when an object is detected within the threshold distance of the apparatus or the second trailer. The alert may be one or more of an audible alert, visual alert, or physical alert such as a vibration.

Turning to FIG. 6, another schematic embodiment of an active converter dolly 14 in a B train configuration 600 is shown, in which the active converter 14 is part of the first trailer 12a. In this configuration, the fifth wheel assembly 28 sits on the rear axle of the first trailer 12a. Similar to the embodiment discussed previously and shown in FIG. 1, which may be referred to as an A train configuration, the active converter dolly 14 in a B train configuration 600 is capable of adding power to drive the trailers and to being able to capture energy from regenerative braking. In B train active dollies, at least one of the axles may be electrified as discussed above for adding power to drive the trailers and to being able to capture energy from regenerative braking. Similarly, in A train active dollies with multiple axles, at least one of the axles may be electrified. Electrifying more axles may improve the fuel efficiency and performance of the active converter dolly apparatus 14.

Figure 14:
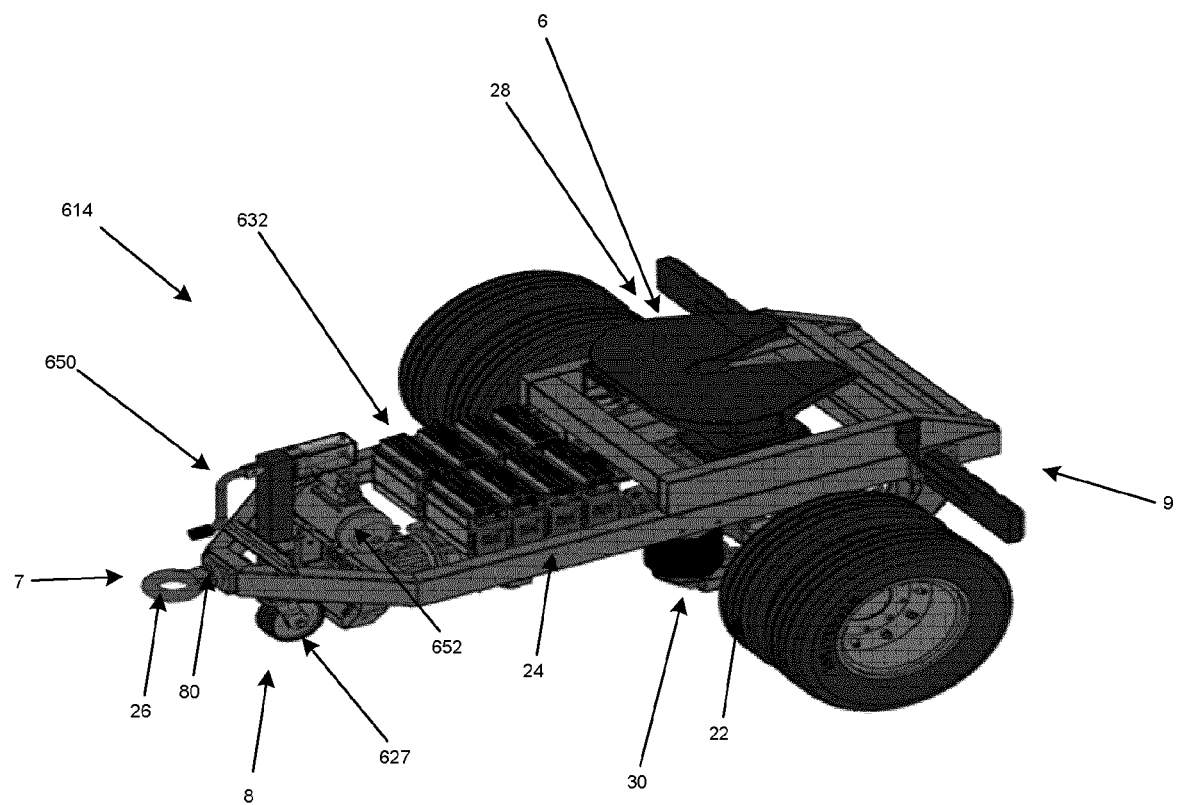
FIG. 14 is a perspective view of another embodiment of an active converter dolly apparatus.

Turning to FIG. 14, a perspective view of a second example embodiment of an active convertor dolly is shown.

In this embodiment, the active converter dolly apparatus 614 includes the same overall structure as the apparatus 14 of FIG. 2a: a frame 24 including a wheel supporting portion 9 and tongue portion 8; a first trailer connection assembly 7, illustrated here as a hitch 26; two sets of wheels 22 mounted to the wheel supporting portion 9; and a second trailer mounting assembly 6 in the form of a fifth wheel assembly 28 mounted to the top of the frame 24.

However, several of the components are have been relocated or altered in this embodiment relative to the embodiment of FIG. 2a. The energy-storing device 32 of FIG. 2a is replaced here with a battery array 632, and the enclosure 34 is not shown in this illustration. The support leg or apparatus 27 of FIG. 2a is shown here in the form of a detachable trailer jack 627. The trailer jack 627 can be used to raise or lower the height of the tongue portion 8 of the apparatus 14 using the included hand-operated crank 650. This embodiment of the apparatus 14 also includes a trailer jack drive 652 coupled to the kinetic energy recovery device 30. The trailer jack drive 652 is powered by the battery array 632, operable to raise or lower the trailer jack 627 as an alternative to the crank 650.

The various components of the kinetic energy recovery device 30 are also relocated in this embodiment from the wheel supporting portion 9 to the tongue portion 8. By locating the battery array 632 and kinetic energy recovery device 30 to the tongue portion, or to an area intermediate the first trailer connector assembly 8 and the second trailer connector assembly 6, this embodiment locates these components farther from the underbody of the second trailer, thereby potentially facilitating cooling and reducing mechanical interference from the second trailer 12b. By locating the battery array 632 and sensitive components of the kinetic energy recovery device 30 to a location intermediate the first trailer connector assembly 8 and the second trailer connector assembly 6, the likelihood of mechanical interference from the first trailer 12a is also reduced. In some embodiments, for example, the tongue portion 8 defines an opening wherein the battery array 632 and other components of the kinetic energy recovery device 30 are disposed within the opening and secured to the frame 24.

Figure 15:
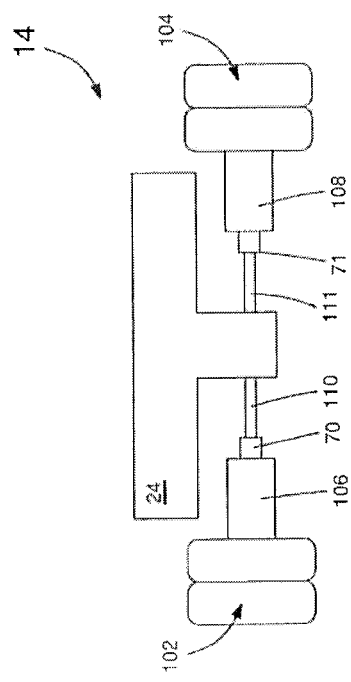
FIG. 15 is a simplified partial rear view of an active converter dolly apparatus with an in-wheel motor configuration.

FIG. 15 is a rear view of an example dolly apparatus 14 with an in-wheel motor configuration, showing details of the axle and wheel configuration. The apparatus 14 has a first wheel 102 on a first side of the frame 24, driven by a first motor-generator 106 and connected to a first drive shaft 110. A first wheel speed sensor 70 is located at the first wheel assembly. The first wheel speed sensor 70 may be attached to the first wheel 102 or the first drive shaft 110 for collecting wheel speed data and providing it to the controller 502. The apparatus 14 also has a second wheel 104 on a second side of the frame 24, driven by a second motor-generator 108 and connected to a second drive shaft 111. A second wheel speed sensor 71 is located at the second wheel assembly. The second wheel speed sensor 71 may be attached to the second wheel 104 or the second drive shaft 111 for collecting wheel speed data and providing it to the controller 502.

Figure 16:
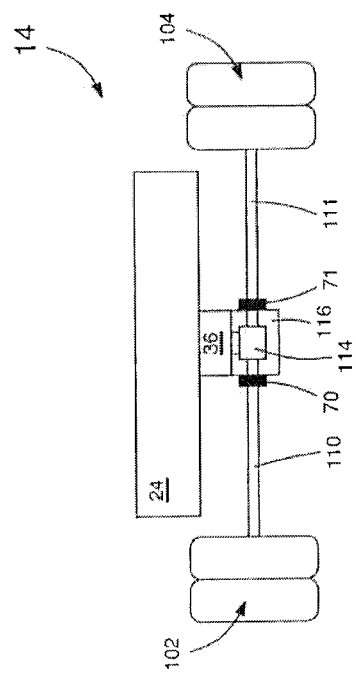
FIG. 16 is a simplified partial rear view of an active converter dolly apparatus with a differential configuration.

FIG. 16 is a rear view of an example active converter dolly apparatus 14 with a two axle-differential configuration, showing details of the axle and wheel configuration. The converter dolly 14 includes a two-part central axle split into a first drive shaft 110 and a second drive shaft 111, one electric motor-generator 36, and a differential 116. The first drive shaft 110 and second drive shaft 111 may in some embodiments be releasably locked together by an axle locking device 114 in response to a wheel-locking control signal from the controller 502. When locked together, the first drive shaft 110 and second drive shaft 111 rotate as a single axle.

In the differential configuration of FIG. 16 there may be less space to house the enclosure 34 between the wheel sets, however, the other aspects remain the same. The enclosure 34 may require an adaptation to permit the drive shafts 110,111 to traverse the compartment, and the motor-generator 36 also needs to be connected through the differential 116. However, even with a central transverse axle, this embodiment may include the aerodynamically efficient, lightweight, waterproof and corrosion resistant battery enclosure 34 and an instrumentation package of appropriate modules to allow for interfacing with the towing vehicle motor control system, to interface with the proximity sensors to provide a back-up steering system, to interface with a remote controller to permit the dolly to be remotely steered around even when disconnected for the tractor trailer train and will allow the dolly to operate equally well in forward or reverse.

FIGS. 17 to 20 show the operation of the controller 502 in relation to other vehicle systems while operating in the various modes described briefly above.

Figure 17:
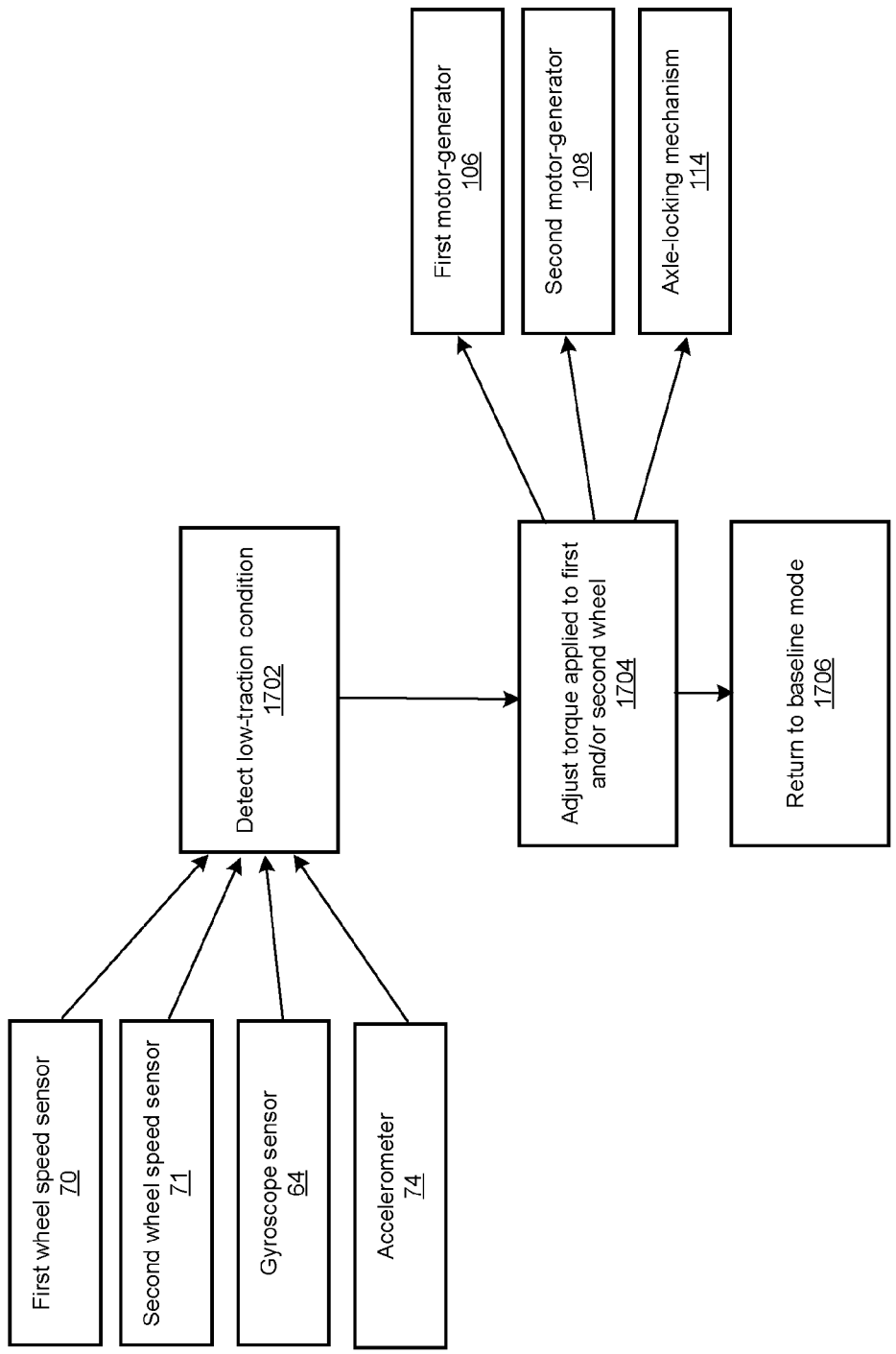
FIG. 17 is a flowchart showing the operation of an example controller of an active converter dolly apparatus operating in a stability-assistance mode.

In FIG. 17, an example operation of the stability-assistance mode is shown as a flowchart. At step 1702, the controller 502 operates to detect a low-traction condition based at least in part on data provided by the first wheel speed sensor 70, the second wheel speed sensor 71, the gyroscope sensor 64, and the linear accelerometer 74. In some embodiments, this detection 1702 may be based entirely on data from the wheel speed sensors 70, 71 indicating that one wheel is rotating significantly faster than the other, for example that the difference between the speed of the first wheel 102 and the speed of the second wheel 104 is above a certain threshold. In other embodiments, this wheel speed data may be supplemented or replaced in the detection step 1702 by angular acceleration data from the gyroscope sensor 64 and linear acceleration data from the linear accelerometer 74 indicating that the yaw acceleration (i.e. angular acceleration about a vertical Z-axis) of the dolly 14 has increased or is above a certain threshold while the dolly 14 is moving forward.

When the low-traction condition has been detected at step 1702, the controller then adjusts the motive rotational force applied to the wheels at step 1704. Depending on the configuration of the dolly 14, the adjustment may be to the motive rotational force applied to one or both wheels of the apparatus 14.

For example, in a differential configuration such as the one shown in FIG. 16, the electronic locking device 114 will lock the differential drive, essentially turning the two drive shafts 110,111 into a single solid axle. Such action will transfer the motive rotational force to the wheel with traction and therefore reduce the instability of the converter dolly 14. In some embodiments, when the low-traction condition is detected, the system will also cut power to the motor-generator 36 to reduce the motive rotational force output to the wheels 102,104. This may be seen as the application of Vehicle Control System or Vehicle Stability System technology to the active converter dolly 14.

In an in-wheel motor-generator configuration such as the one shown in FIG. 15, the motive rotational force or motive rotational force applied to the first wheel 102 by the first motor-generator 106 may be reduced if the first wheel 102 is detected to be slower than the second wheel 104, and vice-versa with respect to the second motor-generator 108 and second wheel 104. Alternatively or in addition, the motive rotational force or motive rotational force applied to the slower wheel may be increased, or regenerative braking may be applied (or increased in intensity) to the faster wheel.

When yaw acceleration is detected as part of the low-traction condition at step 1702, the adjustment of motive rotational force or motive rotational force at step 1704 may comprise adjusting wheel motive rotational force to counteract the yaw acceleration. For example, when clockwise yaw acceleration is detected, the motive rotational force or motive rotational force applied to the first wheel 102 on the left side of the frame 24 may be decreased, or the motive rotational force applied to the second wheel 104 on the right side of the frame 24 may be increased to generate offsetting counter-clockwise yaw acceleration.

At step 1706, the controller 502 detects that the low-traction mode is no longer present or has been addressed, and the corrective action is discontinued, returning the dolly 14 to a baseline operating mode in which the motive rotational force applied to each wheel follows the standard rules set out above with regard to the various operating modes (drive mode, generator mode, passive mode). This determination may be based on wheel speed data and/or angular and linear acceleration data.

Figure 18:
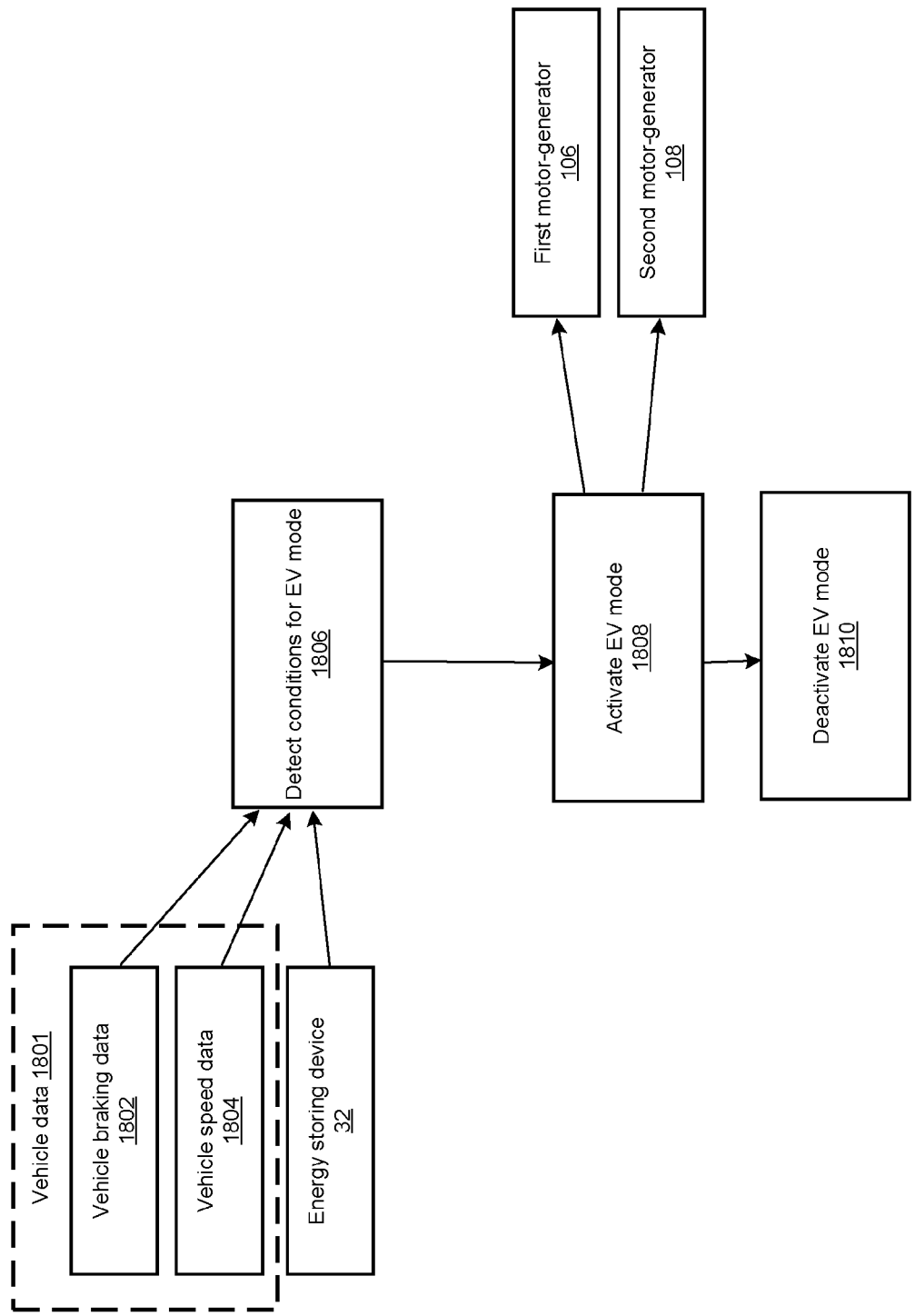
FIG. 18 is a flowchart showing the operation of an example controller of an active converter dolly apparatus configured with an electric-vehicle mode.

In FIG. 18, an example operation of the electric-vehicle (EV) mode is shown as a flowchart. Electric-vehicle mode may be used by the dolly apparatus 14 to drive the tractor-trailer vehicle 10 forward in low-speed conditions, such as slow-moving traffic congestion conditions, with or without the use of the drive of the towing vehicle (e.g., internal combustion engine) being engaged. At step 1806, the controller 502 operates to detect a set of conditions based at least in part on vehicle data 1801 received from the towing vehicle 13 and optionally the SOC of the energy storing device 32 (e.g., battery). The vehicle data 1801 may be received in some embodiments over the electrical connection 72 or the communication interface 68. As noted above, the dolly apparatus 14 may be connected to the OBD II port of the towing vehicle 13 to monitor the real-time operating information from the CAN bus of the towing vehicle 13.

In the illustrated example, the vehicle data 1801 includes vehicle braking data 1802 indicating the degree of braking being applied by the driver of the towing vehicle 13, and vehicle speed data 1804 indicating the speed of the towing vehicle 13 or the entire tractor-trailer vehicle 10. The braking data 1802 may indicate in some embodiments the degree of depression of the brake pedal of the towing vehicle, from 0% depression (no braking) to 100% depression (full braking).

In some embodiments, the conditions for activation of electric-vehicle mode include detecting at step 1804: that the degree of braking is below a braking threshold, that the speed of the vehicle is below a speed threshold, and that the charge of the energy storing device 32 is above a SOC threshold. If these conditions are met, the electric-vehicle mode is activated at step 1808. The braking threshold, speed threshold and SOC threshold may vary between embodiments. For an example, the braking threshold may be between 10% and 50% braking, between 20% and 40% braking, between 25 and 35% braking or approximately 30%. For another example, the speed threshold may be between 5 km/h and 45 km/h, between 10 km/h and 40 km/h, between 20 km/h and 30 km/h, or approximately between 25. For yet another example, the SOC threshold may be between 10% and 40% of a full charge level, between 20% and 30% of a full charge level, or approximately 25% of a full charge level.

In electric-vehicle mode, the motor-generators 36 of the dolly 14 are used to drive the apparatus 14, and therefore the tractor-trailer 10, forward. For example, a first motor-generator 106 and second motor-generator 108 may be used to drive wheels on both sides of the dolly 14 forward to move the vehicle in slow speed conditions.

The controller 502 in some embodiments may deactivate electric-vehicle mode at step 1810 upon detecting that the conditions detected at step 1806 no longer hold. For example, if the driver applies the brakes above the braking threshold, or if the charge level of the energy storing device 32 drops below the SOC threshold, or the speed of the vehicle rises above the speed threshold, then the electric-vehicle mode may be deactivated.

Figure 19:
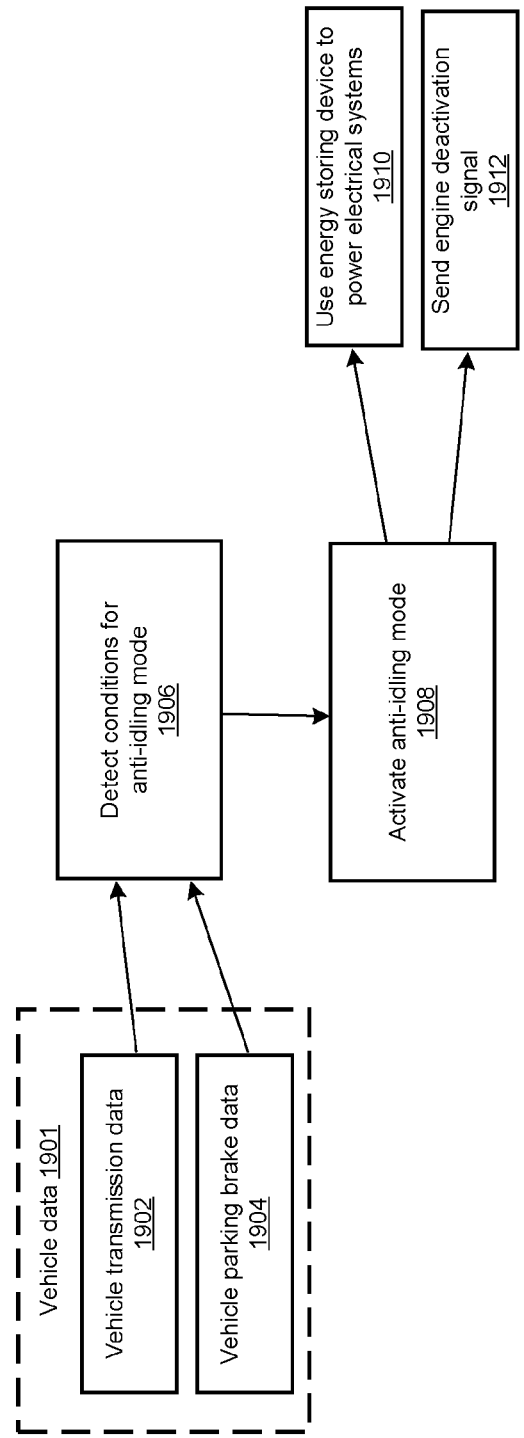
FIG. 19 is a flowchart showing the operation of an example controller of an active converter dolly apparatus configured with an anti-idling mode.

In FIG. 19, an example operation of the anti-idling mode is shown as a flowchart. Anti-idling mode may be used by the apparatus 14 to power various electrical systems of the tractor-trailer 10 using the energy storing device 32 when the vehicle is idling, temporarily stopped or parked, without having to run the engine of the towing vehicle 13 to maintain power. High voltage cables may be used to connect the apparatus 14 to the first trailer 12a and through the first trailer 12 to the towing vehicle 13. A DC-DC converter may be used by the towing vehicle to step down the high voltage of the energy storage device 32 (i.e., battery) to match the low voltage system of the auxiliary components of the towing vehicle 13. A control system may be used to automatically shut off the engine of the towing vehicle 13 and subsequently restart the engine. Depending on the characteristics of the towing vehicle 13, the engine starter may be modified from manufacturer's condition so that the apparatus 14 may operate in the anti-idling mode.

The controller 502 operates to detect the conditions for activation of anti-idling mode at step 1906, based at least in part on received vehicle data 1901. With respect to anti-idling mode in the illustrated example, the vehicle data 1901 used by the controller 502 at step 1906 includes vehicle transmission data 1902 indicating the state of the transmission of the towing vehicle 13 (e.g. whether the engine is on but the towing vehicle 13 is in park, neutral, reverse, or a drive gear). In some embodiments, such as some embodiments configured to be used with a towing vehicle 13 with a manual transmission, the vehicle data 1901 may also include towing vehicle parking brake data 1904 indicating the state of the towing vehicle's parking brake (e.g. engaged or not engaged).

Anti-idling mode may be activated by the controller 502 upon detecting at step 1906 that the towing vehicle 13 is stopped for at least a predetermined amount of time, the towing vehicle 13 is in a parked state, or both. The predetermined amount of time may vary between in embodiments. In some embodiments, the predetermined amount of time is between 10 and 60 seconds, between 15 and 45 seconds, or approximately 30 seconds. Detecting that towing vehicle 13 is in a parked state is in a parked state may, in some embodiments, comprise detecting that the towing vehicle 13 has its transmission set to a parked state based on the transmission data 1902. In other embodiments, such as some embodiments configured to be used with a towing vehicle 13 with a manual transmission, this may comprise detecting that the transmission is in park gear and optionally detecting that the parking brake is engaged.

When anti-idling mode is activated at step 1908, the stored power in the energy storing device 32 may be used to power one or more electrical systems of the tractor-trailer 10 at step 1910. The power may be relayed via the electrical connection 72. Examples of such systems include HVAC systems used in the towing vehicle 13; refrigeration or HVAC systems used in the first trailer 12a or second trailer 12b; lights, stereo system, or other user amenities in the towing vehicle 13; lights on the towing vehicle 13 or the trailers 12a,12b; or any other electrical system on the towing vehicle 13, first trailer 12a, second trailer 12b, or dolly apparatus 14. The voltage of the energy storing device 32 may be significantly higher than the systems being powered in some embodiments; in such embodiments, the electrical connection 72 may include one or more DC-DC converters or transformers as described above for stepping down the voltage.

In some embodiments, the controller 502 may further operate to shut off the engine of the towing vehicle at step 1912 in response to activating anti-idling mode. The controller 502 may send an engine deactivation signal via the communication interface 68 or electrical connection 72, as further described above, to deactivate the engine of the towing vehicle 13 to prevent idling. In other embodiments, the engine may be shut down manually or some other system may be used to shut down the engine when anti-idling mode is active. Some embodiments may also be configured to restart the engine using a process as described above.

Figure 20:
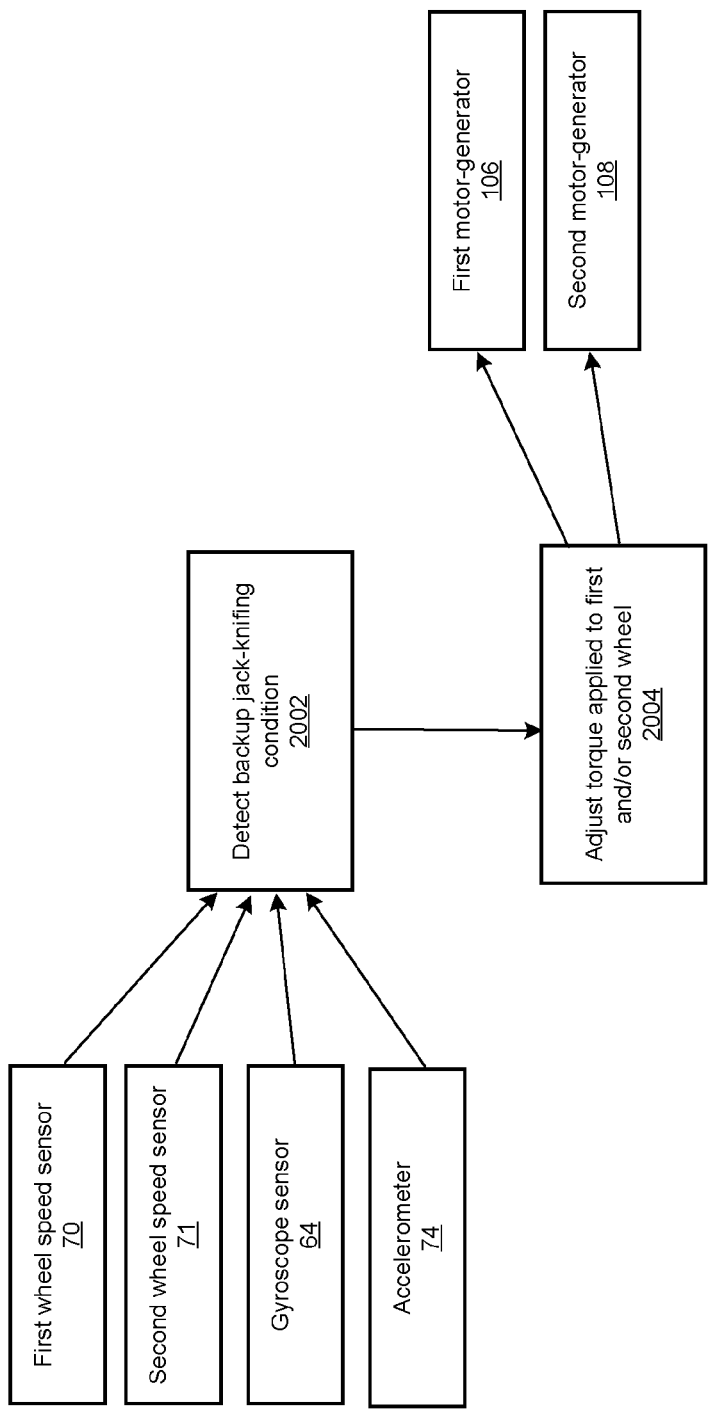
FIG. 20 is a flowchart showing the operation of an example controller of an active converter dolly apparatus operating in a backup-assistance mode.

In FIG. 20, an example operation of the backup-assistance mode is shown as a flowchart. Backup-assistance mode in the illustrated example operates in a similar manner to stability-assistance mode, but generally operates at lower speeds and is activated under different conditions. Its purpose is to keep the tractor-trailer straight when backing up and to prevent jack-knifing conditions whereby one or more of the trailers 12a, 12b deviates from the longitudinal orientation of the tractor-trailer vehicle 10 as a whole.

At step 2002, much like in low-traction detection step 1702 of FIG. 17, the controller 502 detects that the wheels of the dolly 14 are moving at different speeds and/or are creating yaw acceleration of the dolly 14, using a combination of wheel speed, angular acceleration, and/or linear acceleration data. If this happens while the dolly 14 is moving backward, it would indicate that the dolly is turning. Although there may be times that a driver intends to cause the trailers to turn when backing up, this intention may in some embodiments be indicated by a user input communicated to the controller 502 as vehicle data, much like vehicle data 1801 or 1901. The process illustrated in FIG. 20 assumes that backup-assistance mode has not been deactivated by the driver to allow the trailers to turn when backing up.

If the controller detects at step 2002 that the dolly is turning (i.e. that a jack-knifing condition is present), motive rotational force applied to the wheels is adjusted at step 2004 much like the remedial motive rotational force adjustments applied in stability-assistance mode in FIG. 17. For example, if the dolly is turning to the right (counter-clockwise) while backing up, the motive rotational force applied to a right-hand-side second wheel 104 by a second motor-generator 108 may be increased, thereby causing the dolly 14 to experience yaw acceleration clockwise. Other variations on motive rotational force adjustment using the motor functions and/or the braking functions of the motor-generators 36 are as described above with respect to stability-assistance mode.

In one aspect, the apparatus of the disclosure provides advantages over current converter dollies. For instance, in some embodiments, the active converter dolly 14 of the disclosure reduces fuel consumption emission levels. In some embodiments, the active dolly may operate to assist in fulfilling a power demand (acceleration, grade ability and maximum, or highest, cruising speed) of the tractor-trailer 10. In some embodiments, the disclosure is directed at maintaining a battery's state of charge (SOC) within a reasonable level, for self-sustaining operation whereby no external charging is required. Also, the disclosure is directed at an active converter dolly that may be able to harvest braking energy to generate electricity.

It will be appreciated by those skilled in the art that various modifications and alterations can be made to the present invention without departing from the scope of the invention as defined by the appended claims. Some of these have been suggested above and others will be apparent to those skilled in the art. For example, although a preferred form of the present disclosure includes separate motors for each wheel set, the present invention can also be used with a cross axle and differential in and single electrical power source, provided the same provides enough total energy to hybridize the truck travel.

In the preceding description, for purposes of explanation, numerous details are set forth in order to provide a thorough understanding of the embodiments; however the specific details are not necessarily required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

The coding of software for carrying out the above-described methods described for execution by a controller (or processor) of the dolly apparatus 14 or other apparatus is within the scope of a person of ordinary skill in the art having regard to the present disclosure. Machine readable code executable by one or more processors of one or more respective devices to perform the above-described method may be stored in a machine readable medium such as the memory of the data manager. The terms "software" and "firmware" are interchangeable within the present disclosure and comprise any computer program stored in memory for execution by a processor, comprising RAM memory, ROM memory, erasable programmable ROM (EPROM) memory, electrically EPROM (EEPROM) memory, and non-volatile RAM (NVRAM) memory. The above memory types are example only, and are thus not limiting as to the types of memory usable for storage of a computer program.

All values and sub-ranges within disclosed ranges are also disclosed. Also, although the systems, devices and processes disclosed and shown herein may comprise a specific plurality of elements/components, the systems, devices and assemblies may be modified to comprise additional or fewer of such elements/components. For example, although any of the elements/components disclosed may be referenced as being singular, the embodiments disclosed herein may be modified to comprise a plurality of such elements/components. The subject matter described herein intends to cover and embrace all suitable changes in technology.

Although the present disclosure is described, at least in part, in terms of methods, a person of ordinary skill in the art will understand that the present disclosure is also directed to the various components for performing at least some of the aspects and features of the described methods, be it by way of hardware (DSPs, ASIC, or FPGAs), software or a combination thereof. Accordingly, the technical solution of the present disclosure may be embodied in a non-volatile or non-transitory machine readable medium (e.g., optical disk, flash memory, etc.) having stored thereon executable instructions tangibly stored thereon that enable a processing device (e.g., a data manager) to execute examples of the methods disclosed herein.

The term "processor" may comprise any programmable system comprising systems using micro- or nano-processors/controllers, reduced instruction set circuits (RISC), application specific integrated circuits (ASICs), logic circuits, and any other circuit or processor capable of executing the functions described herein. The term "database" may refer to either a body of data, a relational database management system (RDBMS), or to both. As used herein, a database may comprise any collection of data comprising hierarchical databases, relational databases, flat file databases, object-relational databases, object oriented databases, and any other structured collection of records or data that is stored in a computer system. The above examples are example only, and thus are not intended to limit in any way the definition and/or meaning of the terms "processor" or "database".

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. An apparatus for releasably coupling a second trailer to a first trailer that is releasably coupled to a towing vehicle in a tractor-trailer vehicle configuration, the apparatus comprising:
a frame;
a first trailer connector assembly for releasably coupling the apparatus to the first trailer such that the apparatus translates with the first trailer;
a second trailer connector assembly for releasably coupling the apparatus to the second trailer such that the second trailer translates with the apparatus;
a pair of wheels rotatably coupled to the frame;
an energy storing device for storing electrical energy;
a pair of motor-generators, each motor-generator, independently, being operably coupled to one of the wheels in the pair of wheels and to the energy storing device, such that each motor-generator is operable in:
a drive mode for applying a motive rotational force to its respective wheel; and
a generator mode for applying a regenerative braking force to its respective wheel for converting mechanical energy generated by rotation of the wheel to electrical energy wherein the generated electrical energy is stored on the energy-storing device; and
a controller for selectively activating the drive mode or the generator mode of each motor-generator.

2. The apparatus as claimed in claim 1, wherein:
each one of the wheels, independently, includes a hub; and
each motor-generator of the pair of motor-generators is disposed within the hub of the wheel to which it is operably coupled.

3. The apparatus as claimed in claim 1, wherein each of the motor-generators is independently controlled by the controller.

4. The apparatus as claimed in claim 1, further comprising:
collision avoidance sensors communicatively coupled to the controller, wherein the collision avoidance sensors are mounted to the apparatus or to the second trailer and configured to detect any objects within a threshold distance of the apparatus or the second trailer, the controller being configured to generate an alert when an object is detected within the threshold distance of the apparatus or the second trailer.

5. The apparatus of claim 3, further comprising:
a first wheel speed sensor operably coupled to a first wheel of the pair of wheels for providing first wheel speed data comprising a first wheel speed to the controller; and
a second wheel speed sensor operably coupled to a second wheel of the pair of wheels for providing second wheel speed data comprising a second wheel speed to the controller,
wherein the controller is configured to:
detect a low-traction condition based on at least the first wheel speed data and the second wheel speed data; and
adjust the motive rotational force applied to at least one of the first wheel and the second wheel when the low-traction condition is detected.

6. The apparatus of claim 5, wherein detecting the low-traction condition comprises detecting that a difference between the first wheel speed and the second wheel speed is above a predetermined threshold.

7. The apparatus of claim 5, wherein adjusting the motive rotational force comprises:
increasing the motive rotational force applied by a first motor-generator of the pair of motor-generators to the first wheel if the controller detects a condition wherein the first wheel speed is lower than the second wheel speed; and
increasing the motive rotational force applied by a second motor-generator of the pair of motor-generators to the second wheel if the controller detects a condition wherein the second wheel speed is lower than the first wheel speed.

8. The apparatus of claim 5, wherein adjusting the motive rotational force comprises:
reducing the motive rotational force applied by a first motor-generator of the pair of motor-generators to the first wheel if the controller detects that the first wheel speed is higher than the second wheel speed; and
reducing the motive rotational force applied by a second motor-generator of the pair of motor-generators to the second wheel if the controller detects that the second wheel speed is higher than the first wheel speed.

9. The apparatus of claim 5, further comprising:
a gyroscope sensor attached to the frame for providing angular acceleration data to the controller; and
an accelerometer for providing linear acceleration data to the controller,
wherein:
the low-traction condition is detected based at least in part on the angular acceleration data.

10. The apparatus of claim 9, wherein detecting the low-traction condition comprises:
detecting that the apparatus is moving forward based on the linear acceleration data; and
detecting an increase in the angular acceleration of the apparatus about a vertical axis of the apparatus based on the angular acceleration data.

11. The apparatus of claim 10, wherein adjusting the motive rotational force comprises:
adjusting the motive rotational force applied by at least one motor-generator of the pair of motor-generators to create angular acceleration in the opposite direction of the detected increase in angular acceleration.

12. The apparatus of claim 1, further comprising:
a communication interface for providing vehicle data from the towing vehicle to the controller;
wherein:
the towing vehicle, the first trailer, and the second trailer collectively include a plurality of electrical systems;
the releasable coupling of the apparatus to the first trailer via the first trailer connector assembly includes electrical connection of the pair of motor-generators and the energy storing device to the first trailer for providing power from the energy storing device to one or more of the first trailer and the towing vehicle;

the vehicle data comprises vehicle transmission data indicating the state of the transmission of the towing vehicle; and the controller is further configured to activate an anti-idling mode in response to detecting at least one of the following alternatives: the towing vehicle has been stopped for at least a predetermined amount of time or a parked state of the towing vehicle based on at least the vehicle transmission data, the anti-idling mode comprising using the energy storing device to power one or more electrical systems selected from the plurality of electrical systems.

13. The apparatus of claim 12, wherein:

the towing vehicle has a manual transmission;

the vehicle data further comprises parking brake data indicating the state of a parking brake of the towing vehicle; and the parked state is detected based on at least vehicle transmission data indicating that the transmission is in a manual state and parking brake data indicating that the parking brake is in an engaged state.

14. The apparatus of claim 12, wherein activating the anti-idling mode further comprises sending an engine deactivation control signal to the towing vehicle.

15. The apparatus of claim 5, wherein the controller further is configured to:

detect a backup jack-knifing condition based on at least the first wheel speed data and the second wheel speed data; and adjust the speed of at least one of the first wheel and the second wheel when a backup jack-knifing condition is detected.

16. A method for providing stability assistance to a converter dolly towing a second trailer behind a first trailer, the first trailer being towed by a towing vehicle, the converter dolly comprising:

at least a first wheel rotatably coupled to a left side of the converter dolly and a second wheel rotatably coupled to a right side of the converter dolly, the first wheel being operably coupled to a first motor-generator, the second wheel being operably coupled to a second motor-generator, such that the first motor-generator and second motor-generator are each, independently, operable in:

(i) a drive mode for applying a motive rotational force to therespective first wheel or second wheel; and (ii) a generator mode for applying a regenerative braking force to the respective first wheel or second wheelfor converting kinetic energy generated by rotation of the respective first wheel or second wheel the electrical energy, the regenerative braking force effecting deceleration of the respective first wheel or second wheel;

the method comprising:

detecting a low-traction condition based on at least a rotational speed of the first wheel and a rotational speed of the second wheel; and adjusting one or more of the motive rotational force and the regenerative braking force applied to at least one of the first wheel and the second wheel when a low-traction condition is detected.

17. The method of claim 16, wherein the first motor-generator and the second motor-generator are controlled independently.

18. The method of claim 16, wherein detecting a low-traction condition comprises detecting that a difference between the rotational speed of the first wheel and the rotational speed of the second wheel is above a predetermined threshold.

19. The method of claim 17, wherein adjusting the motive rotational force comprises:

increasing the motive rotational force applied by the first motor-generator to the first wheel if the rotational speed of the first wheel is lower than the rotational speed of the second wheel; and increasing the motive rotational force applied by the second motor-generator to the second wheel if the rotational speed of the second wheel is lower than the rotational speed of the first wheel.

20. The method of claim 16, wherein the low-traction condition is detected based at least in part on detecting an angular acceleration of the apparatus.

* * * * *